United States Patent [19]

Adaniya et al.

[11] Patent Number: 4,889,775

[45] **Date of Patent: * Dec. 26, 1989**

[54] HIGHLY CORROSION-RESISTANT SURFACE-TREATED STEEL PLATE

[75] Inventors: Takeshi Adaniya; Masaaki Yamashita; Takahiro Kubota; Akira Enatsu, all of Tokyo; Norio Nikaido, Hiratsuka; Yoshiaki Miyosawa, Hiratsuka; Tadashi Nishimoto, Hiratsuka; Kazuhiko Ozawa, Hiratsuka, all of Japan

[73] Assignees: Nippon Kokan Kabushiki Kaisha, Tokyo; Kansai Paint Co., Ltd., Amagasaki, both of Japan

[ * ] Notice: The portion of the term of this patent subsequent to Oct. 4, 2005 has been disclaimed.

[21] Appl. No.: 160,030

[22] Filed: Feb. 25, 1988

[30] Foreign Application Priority Data

Mar. 3, 1987 [JP] Japan .................................. 62-46872
Mar. 3, 1987 [JP] Japan .................................. 62-46873

[51] Int. Cl.[4] .............................................. B32B 15/04

[52] U.S. Cl. .................................. 428/62 B; 428/626; 428/632; 428/659; 428/684

[58] Field of Search ............... 428/623, 626, 659, 632, 428/684

[56] References Cited

U.S. PATENT DOCUMENTS

| | | | |
|---|---|---|---|
| 4,407,899 | 10/1983 | Hara et al. | 428/623 |
| 4,411,964 | 10/1983 | Hara et al. | 428/623 |
| 4,450,209 | 5/1984 | Hara et al. | 428/623 |
| 4,548,868 | 10/1985 | Yonezawa et al. | 428/626 |
| 4,659,394 | 4/1987 | Hara et al. | 428/623 |
| 4,775,600 | 10/1988 | Adaniya et al. | 428/623 |

FOREIGN PATENT DOCUMENTS

| | | | |
|---|---|---|---|
| 96291 | 6/1984 | Japan | 428/659 |
| 1023766 | 2/1986 | Japan | 428/659 |

*Primary Examiner*—Robert McDowell
*Attorney, Agent, or Firm*—Henry C. Nields

[57] ABSTRACT

The present invention relates to a highly corrosion resistant surface-treated steel plate. The steel plate of the invention comprises a zinc deposition or zinc alloy deposition film as the undercoat deposition layer, a chromate film formed on the undercoat deposition layer and a film of a resin composition formed on the chromate film. This resin composition comprises a substrate resin formed by adding at least one basic nitogen atom and at least two primary hydrogen groups to terminal of an epoxy resin, silica and sparingly water soluble Cr compound. The resin composition may comprise a polyisocyanate compound as the curing agent. Moreover, the resin composition may comprise a silane compound as the crosslinking agent for the substrate resin and silica.

63 Claims, 6 Drawing Sheets

FIG_1
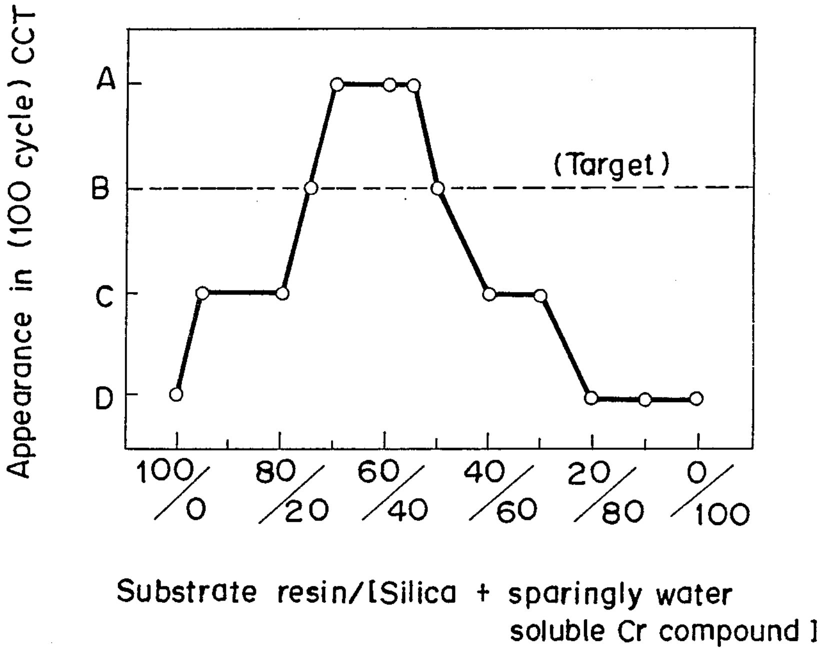
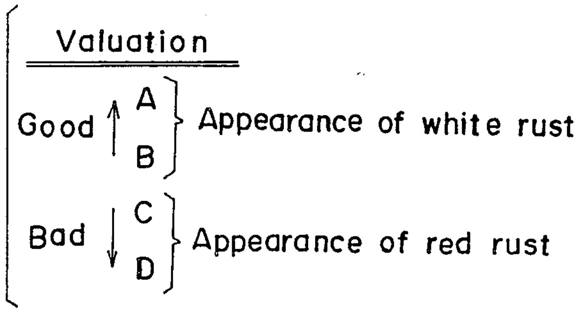

FIG_2
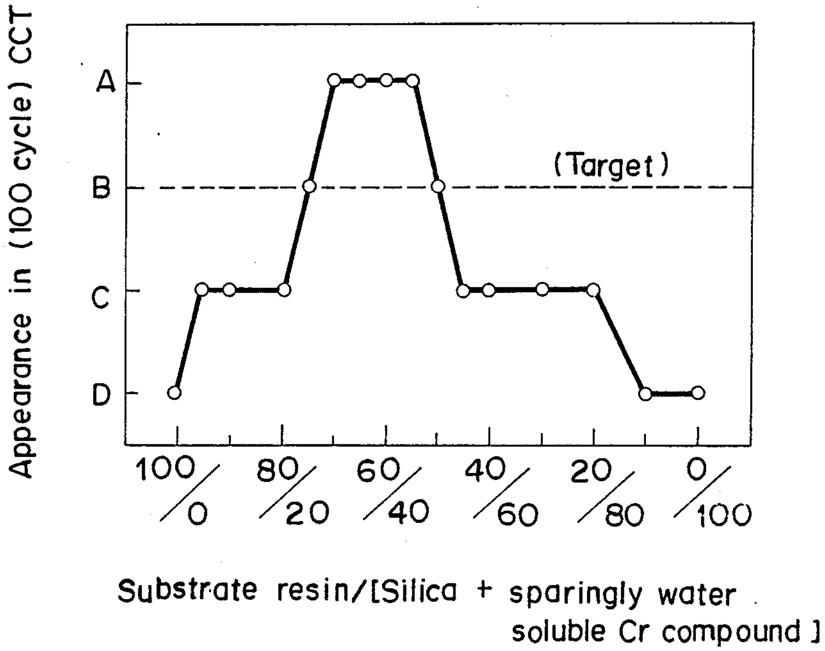
Valuation
Good ↑ A, B } Appearance of white rust
Bad ↓ C, D } Appearance of red rust FIG_3
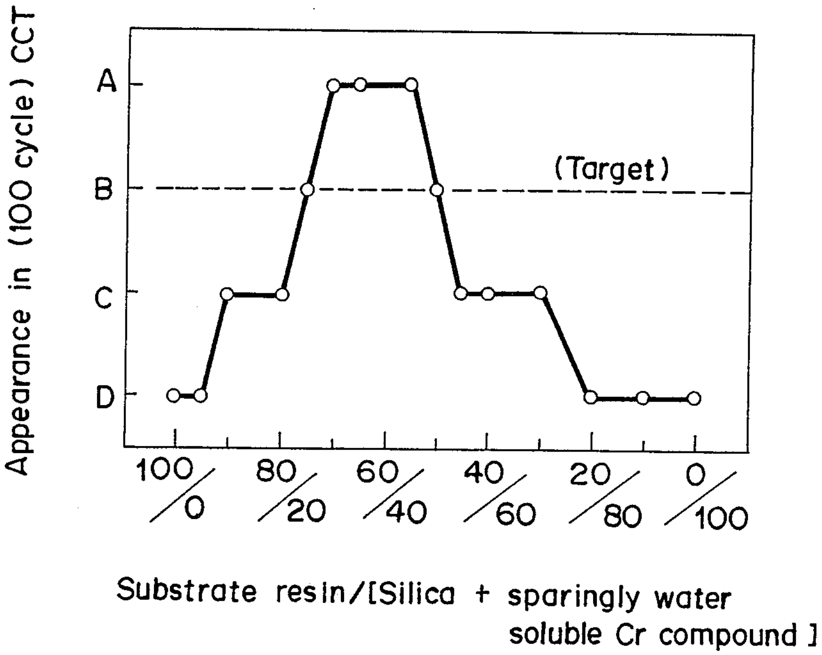
Valuation
Good ↑ A, B } Appearance of white rust
Bad ↓ C, D } Appearance of red rust FIG_4
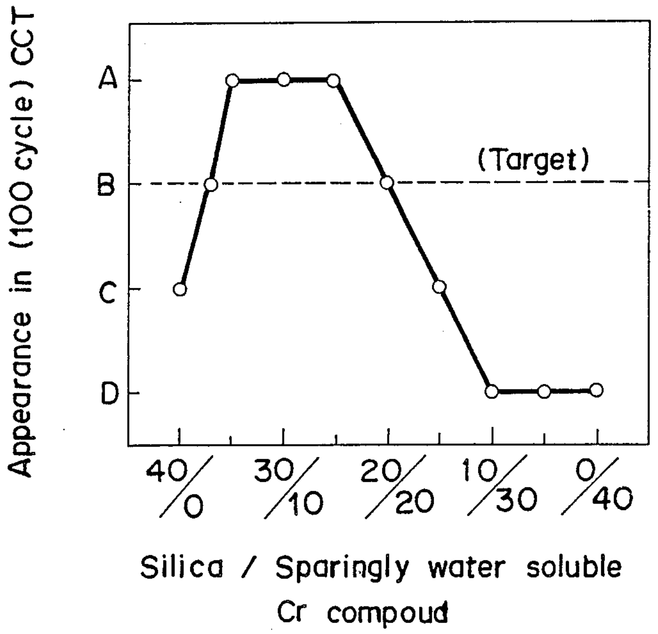
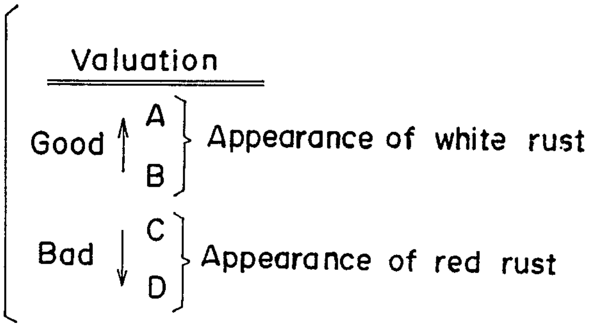

FIG_5
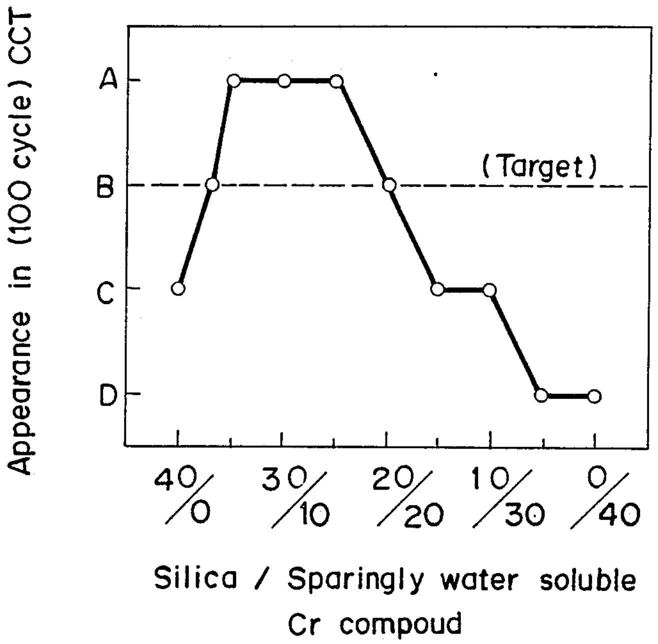
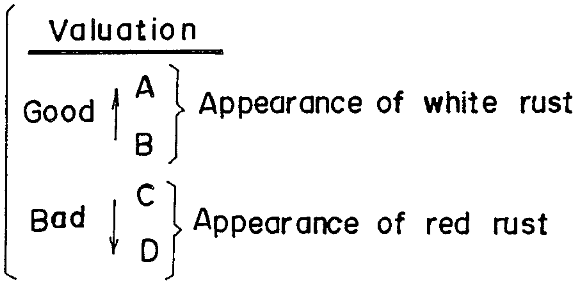

FIG_6
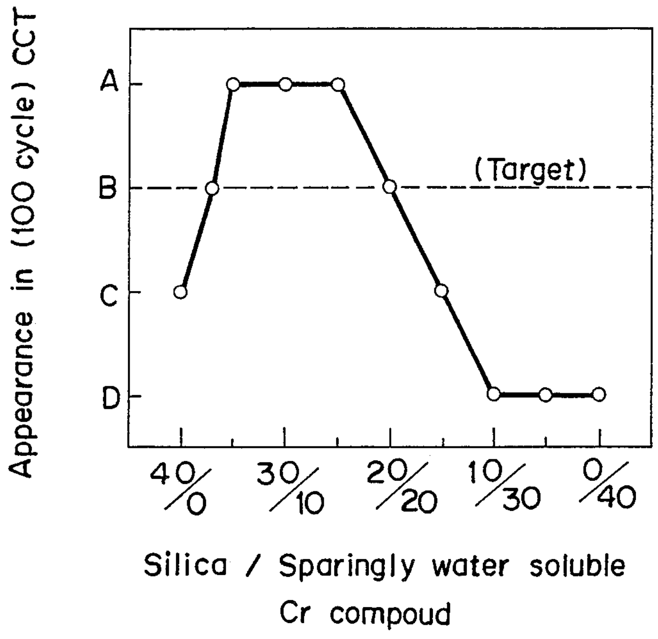
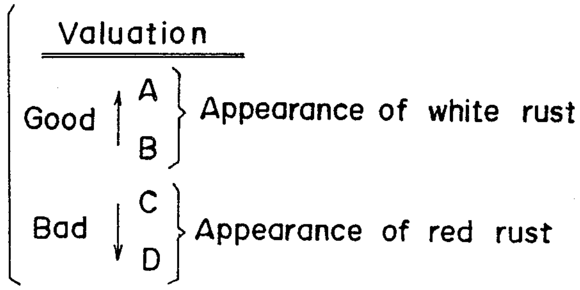

HIGHLY CORROSION-RESISTANT SURFACE-TREATED STEEL PLATE

BACKGROUND OF THE INVENTION

Recently, a high corrosion resistance is required for a steel plate used for a car body, and there is a growing tendency that a surface-treated steel plate having a high corrosion resistance is used instead of a cold-rolled steel plate heretofore used.

As the surface-treated steel plate, a zinc-deposited steel plate can be first of all mentioned. In this deposited steel plate, in order to increase the corrosion resistance, the amount deposited of zinc should be increased. However, increase of the amount deposited of zinc results in degradation of the workability and weldability. As a steel plate overcoming this defect, there has been studied and developed a zinc alloy-deposited steel plate or multiple layer-deposited steel in which at least one element selected from the group consisting of Ni, Fe, Mn, Mo, Co, Al and Cr is added, and in steel plates of this type, the corrosion resistance can be improved over that of the above-mentioned zinc-deposited steel plate without degradation of the workability or weldability. When a steel plate is applied to a bag structure portion or curved portion (hemmed portion) of an inner plate of a car, a high corrosion resistance is required for the surface of the steel plate, and the above-mentioned zinc alloy-deposited steel plate or multiple layer-deposited steel plate is still insufficient in the corrosion resistance. A rust-preventive coated steel plate having a zinc-rich coating, as disclosed in Japanese Patent Publication No. 24230/70 or No. 6882/72, has been studied and developed as a steel plate having a high corrosion resistance, and a steel plate called "Zincrometal" is known as a typical instance of the steel plate of this type. However, even in this rust-preventive coated steel plate, peeling of the coating is often caused in a processed portion, for example, a portion subjected to press-forming, resulting in degradation of the corrosion resistance. Therefore, this coated steel plate is not sufficiently satisfactory as a highly anti-corrosive, rust-preventive coated steel plate meeting the requirement for a car body material.

Under this background, we newly developed a steel plate having a protecting film free of a metal powder such as a Zn powder in the form of a thin film (having a thickness smaller than several microns) based on the consideration that the improvement of the capacity of the rust-preventive coated steel plate by the zinc-rich coating layer is limited, and we proposed this new steel plate in Japanese Patent Application Laid-Open Specifications No. 224174/83, No. 50179/85, No. 50180/85 and No. 50181/85. This steel plate is obtained by forming a chromate film and an organic composite silicate film as the topmost layer on a zinc-deposited or zinc alloy-deposited steel plate as the base. This coated steel plate is especially excellent in the workability and corrosion resistance.

A part (trunk lid, hood or the like) of the inner face of a car body is sometimes coated with at least two coating layers including a topcoat formed on a cation electrodeposition coating. In case of the above-mentioned coated steel plate previously proposed by us, it is apprehended that the adhesion is insufficient in case of this multilayer coating. Therefore, in Japanese Patent Application Laid-Open Specification No. 174879/85, we proposed a proces in which the above-mentioned steel plate is improved and a rust-preventive steel late for multilayer coating excellent in the adhesion of the multi-layer coating is prepared.

According to this process, an organic polymer film is sufficiently crosslinked by baking at a high temperature of 250° to 350° C. to ensure an excellent adhesion to a multi-layer coating. If crosslinking of the polymeric film is insufficient, the film is softened and swollen by an alkali generated in the interface at the cation electrodeposition, resulting in degradation of the adhesion of the coating. This defect is overcome by crosslinking by high-temperature baking.

From the results of research made by us afterward, it was found that although in the above-mentioned steel plate an excellent adhesion to a multi-layered coating having at least two coating layers can be ensured by baking at a high temperature exceeding 250° C., the so-called bare corrosion resistance (uncoated corrosion resistance), that is, the corrosion resistance on the supposition that an electrodeposition coating layer is hardly formed, is insufficient and if the surface treatment coating film is damaged, for example, if a cross cut extending to the iron substrate is formed or the steel plate is subjected to deep-draw forming or draw beading, the bare corrosion resistance is somewhat inferior to that of the steel plate as disclosed in Japanese Patent Application Laid-Open Specification No. 224174/83 mentioned above.

In addition to excellent workability and weldability, the following properties are required for a highly corrosion-resistant surface-treated steel plate for a car body:

(1) A high corrosion resistance of a portion where an electrodeposition coating is hardly formed, such as a bag structure portion or a hemmed portion, that is, a high bare corrosion resistance.

(2) Good coating propoerties (high adhesion and high corrosion resistance of the coating) of a multi-layer coating including at least two coating layers (cation electrodeposition coating layer and topcoat layer) on the inner face of a trunk lid or hood.

At the present, the requirement for improving the corrosion resistance in a car body is increasing, and the above-mentioned steel plate cannot be regarded as satisfying this requirement sufficiently.

The present invention is to solve the foregoing problem and provide a highly corrosion-resistant surface-treated steel plate which has good workability and weldability and is excellent in bare corrosion resistance, adhesion to a multi-layer coating and corrosion resistance of the coating.

SUMMARY OF THE INVENTION

The present invention relates to a highly corrosion-resistant surface-treated steel plate. More particularly, the present invention relates to a surface-treated steel plate suitable for a car body or the like.

This surface-treated steel plate comprises a zinc deposition layer or a zinc alloy deposition layer (such as Zn-Ni alloy or Zn-Mn alloy deposition layer) as the undercoat deposition film, a chromate film formed on the surface of the undercoat deposition film and a film of a resin composition formed on the chromate film, which comprises a base resin formed by adding at least one basic nitrogen atom and at least two primary hyroxyl groups to terminals of an epoxy resin, silica and sparingly water soluble Cr compound.

Each of the components forming the resin composition films is mixed at the following weight ratios.

| |
|---|
| Base resin/silica = 99/1 to 30/70 |
| Base resin/sparingly water soluble Cr compound = 99/1 to 60/40 |
| Base resin/(silica + sparingly water soluble Cr compound = 75/25 to 50/50 |
| Silica/sparingly water soluble Cr compound = 37/3 to 20/20. |

The resin composition may be added with polyisocyanate as a hardening agent, and with silan compound as a crosslinking agent between the base resin and silica component.

BRIEF DESCRIPTION OF THE DRAWINGS

FIGS. 1 to 3 show the relationships between base resin/(silica+sparingly water Cr compound) and corrosion resistance. FIGS. 4 to 6 show the relationships between silica/sparingly water Cr compound and corrosion resistance.

DETAILED DESCRIPTION OF THE INVENTION

The present invention will now be described in detail.

In the present invention, a zinc-deposited or zinc alloy-deposited steel plate is used as the starting material, and a chromate film is formed on the deposition layer and a basic epoxy resin film is formed on the chromate film.

As the starting zinc type deposited steel plate, there can be mentioned a zinc-deposited steel plate and a zinc alloy-deposited steel plate. As the zinc alloy-deposited steel plate, there can be mentioned a zinc/iron alloy-deposited steel plate, a zinc/nickel alloy-deposited steel plate, a zinc/manganese alloy-deposited steel plate, a zinc/aluminum alloy-deposited steel plate and a zinc-/cobalt/chromium alloy-deposited steel plate. At least one member selected from the group consisting of Ni, Fe, Mn, Mo, Co, Al and Cr may be added to the foregoing deposition elements of steel plates. Furthermore, composite deposition steel plates comprising at least two deposition layers selected from the foregoing deposition layers, which may be the same or different, can be used. For example, a deposit film comprising at least two Fe/Zn alloy deposited layers differing in the Fe content may be used.

Among these deposited steel plates, a zinc/nickel alloy-deposited steel plate and a zinc/manganese alloy-deposited steel plate are especially preferred in view of the corrosion resistance. When these zinc alloy-deposited steel plates are used, it is preferred that the nickel content in the deposition film be 5 to 20% by weight in the zinc/nickel alloy-deposited steel plate and the manganese content in the deposition layer be 30 to 85% by weight in the zinc/manganese alloy-deposited steel plate.

Any of the electrolytic deposition process, the melt deposition process and the gas phase deposition method, that can be worked, may be adopted as the deposition method for the production of a zinc type deposited steel plate as described above. The rust-preventive steel plate intended in the present field, it is important that the deposition should be carried out so that the quality of a cold-rolled steel plate subjected to the deposition is not degraded. In view of this requirement, it will be understood that the electric deposition process in which no heat is generated is advantageous.

It is preferred that the amount deposited of chromium (dry base) in the chromate film be 1 to 1000 $mg/m^2$, especially 10 to 200 $mg/m^2$. More preferably, the amount of the chromium deposited ranges from 30 to 80 $mg/m^2$, calculated as metallic chromium. If the amount of chromium deposited exceeds 200 $mg/m^2$ then the workability and weldability tend to deteriorate. In particular, this tendency becomes remarkable in an amount exceeding 1000 $mg/m^2$. If the amount of chromium deposited is less than 10 $mg/m^2$, it is then likely that the resulting film tends to become uneven deterioration of its corrosion resistance. Such deterioration of corrosion resistance becomes especially remarkable in an amount of less than 1 $mg/m^2$. The presence of hexavalent chrmium in the chromate film is present. Hexavalent chrmium has a repairing action and when the steel plate is damaged, hexavalent chromium exerts a function of preventing corrosion from advancing from the damaged portion. chromium in the chromate film is present. Hexavalent chromium has a repairing action and when the steel plate is damaged, hexavalent chromium exerts a function of preventing corrosion from advancing from the damaged portion.

The chromate treatment for formation of this undercoat film may be accomplished by any of the reaction type treatment, the coating treatment and the electrolytic treatment.

A coating liquid for the coating treatment comprises a solution of partially reduced chromic acid as the main component, and if necessary, the treating liquid contains an organic resin such as a water-dispersible or water-soluble acrylic resin and/or silica having a particle size of several to several hundred millimicrons (colloidal silica or fused silica). It is preferred that the $Cr^{3+}/Cr^{6+}$ ratio be from 1/1 to $\frac{1}{3}$ and the pH value be 1.5 to 4.0, especially 2 to 3. The $Cr^{3+}/Cr^{6+}$ ratio is adjusted to a predetermined value by using an ordinary reducing agent (such as a saccharide or an alcohol) or an inorganic reducing agent. The coating chromate treatment may be accomplished by a roll coater method, a dip coating method and a spray coating method. In the coating chromate treatment, drying is carried out without performing water washing, and a chromate film is obtained. The reason why drying is carried out without performing water washing is that $Cr^{6+}$ is removed by ordinary water washing. Namely, if drying is thus carried out without performing water washing, the $Cr^{3+}/Cr^{6+}$ ratio can be stably maintained, excessive flowout of $Cr^{6+}$ in a corrosive environment is controlled by a basic epoxy resin film formed on the chromate film and a passivating action can be maintained effectively over a long period to obtain a high corrosion-resisting action.

In the electrolytic chromate treatment, a cathode electrolytic treatment is carried out by using a treating liquid containing chromic anhydride and at least one member selected from anions such as sulfuric acid, phosphoric acid, fluorides and halogen oxyacids, and water washing and drying are carried out to form a film. When the chromate film is prepared according to the above-mentioned treatment methods, since the coating type chromate film contains hexavalent chromium in a larger amount than the electrolytic chromate film, the coating type chromate film is excellent in the corrosion resistance, and if the coating type chromate film is heat-treated, as described hereinafter, the film is densified and the strength is increased, and the corrosion resistance is better than that of the electrolytic chromate film. The electrolytic chromate film is advantageous in that the completeness of the film is high irrespectively of whether or not the heat treatment is effected, and that the amount deposited of the film can be easily controlled. In view of the corrosion resistance, the coating type chromate film is most preferred. In a rust-preventive steel plate for a car body, in many cases, only one surface is treated. In view of this fact, the coating type chromate film and the electrolytic chromate film are preferred.

A basic epoxy resin film is formed on the chromate film.

The resin film is formed by heat-curing or dry-curing a film of a resin composition comprising a base resin obtained by adding at least one basic nitrogen atom and at least two primary hydroxyl groups to terminals of an epoxy resin.

The base resin will now be described in detail.

A resin composed mainly of a condensation product obtained by condensing bisphenol A with epichlorohydrin is preferred as the epoxy resin used as the base resin. As the epoxy resin, there can be mentioned an epoxy resin formed solely of an aliphatic structure or alicyclic structure, such as epoxidized oil or epoxybutadiene, but in order to obtain an excellent corrosion resistance, it is preferred that an epoxy resin composed mainly of the above-mentioned condensation product be used. As the epoxy resin, there can be used, for example, Epikotes 828, 1001, 1004, 1007, 1009 and 1010 (each being supplied by Shell Chemical). If curing at a low temperature is necessary, it is preferred than an epoxy resin having a number average molecular weight of at least 1500 be used. The foregoing Epikotes may be used singly or in the form of mixtures of two or more of them. As means for introducing basic nitrogen atoms and primary hydroxyl groups, there can be adopted a method in which an alkanolamine and/or an alkylalkanolamine is added to an oxirane group of the epoxy resin. As the amine, there can be mentioned monoethanolamine, diethanolamine, dimethylaminoethanol, monopropanolamine, dipropanolamine and dibutanolamine. These amines can be used singly or in the form of mixtures of two or more of them.

As another means, there may be adopted a method in which an epoxy resin is partially modified with other compound. In this case, however, it is indispensable that at least two moles of primary hydroxyl groups on the average should be incorporated into one molecule of the epoxy resin.

As the means for partial modification of the epoxy resin, there can be mentioned (1) esterification with a monocarboxylic acid (as the monocarboxylic acid, there can be mentioned saturated or unsaturated fatty acids such as coconut oil fatty acid, soybean oil fatty acid and castor oil fatty acid, low-molecular-weight aliphatic monocarboxylic acids such as acetic acid, propionic acid and butyric acid, and aromatic monocarboxylic acids such as benzoic acid), (2) modification with an aliphatic or aromatic amine (as the aliphatic or aromatic amine, there can be mentioned aliphatic amines such as monomethylamine, dimethylamine, monoethylamine, diethylamine and isopropylamine, and aromatic amines such as aniline), and (3) modification with a hydroxyacid (as the hydroxyacid, there can be mentioned lactic acid and γ-hydroxypropionic acid).

There can also be mentioned modification with a dicarboxylic acid such as adipic acid or sebacic acid. However, this method is not suitable for obtaining the film of the present invention, because the molecular weight of the epoxy resin is increased beyond a necessary level, control of the reaction for obtain a certain molecular weight distribution is difficult and no improvement of the corrosion resistance can be observed.

A water-dispersible or water-soluble composition formed by neutralizing the base of the epoxy resin as the base resin with a low-molecular-weight acid can also be used as the film-forming composition of the present invention.

However, in case of a film for a BH steel plate where drying at a low temperature below 250° C, especially drying at an extremely low temperature below 170° C., is required, it is preferred that the above neutralization be not effected but a composition formed by dissolving the resin in an organic solvent be used.

More specifically, in case of the water-dispersible or water-soluble composition, the acid compound necessary for the solubilization in water forms a salt in the film and in a wet environment, water is readily absorbed in or below the film. Furthermore, under a low temperature drying condition, a sufficiently tough film cannot be obtained, and the corrosion resistance and adhesion are somewhat inferior.

As the organic solvent, there can be used organic solvent customarily used in the field of paints, and they may be used singly or in the form of mixed solvents of two or more of them, but in view of the objects of the present invention, use of a high-boiling-point alcohol type solvent is not preferred. As such alcohol type solvents, there can be mentioned, for example, ethylene glycol, diethylene glycol monoalkyl ethers and alcohols having at least 5 carbon atoms and a primary hydroxyl group. These solvents inhibit the curing reaction of the film. As preferred examples of the solvent, there can be mentioned hydrocarbon type solvents, ketone type solvents, ester type solvents and ether type solvents, and low-melecular weight alcohols having uo to 4 carbon atoms and alcohols having a secondary or tertiary hydroxyl group are preferably used.

The reasons why a film of a resin composition comprising the above-mentioned base resin is formed in the present ivention are as follows.

Namely, in order to obtain a high corrosion resistance and a high adhesion to a multi-layer coating including at least two layers, (1) an epoxy resin is adopted as the base resin so that a high adhesion to the substrate or cation electrodeposition coating and a high corrosion resistance can be obtained, and (2) by rendering the polarity of the resin basic, degradation of the resin structure by an alkali generated in the interface at the cation electrodeposition is prevented.

These features will now be described in detail. If a basic epoxy resin (composed mainly of an epoxy resin formed by condensation of bisphenol A with epichlorohydrin) is used as the base resin, attainment of an excellent adhesion to a cation electrodeposition coating film customarily used for a car body can be expected. Moreover, by introducing basic nitrogen atoms and primary hydroxyl groups into the resin structure, the following effects can be attained.

(1) Breaking of the flm by an alkali generated at the cation electrodeposition can be prevented and the adhesion between the undercoat chromate layer and the cation electrodeposition coating can be stabilized.

(2) By introducing at least two moles of hydroxyl groups per molecule of the epoxy compound, a film having a sufficiently dense crosslinked structure can be obtained (if the amount of the introduced hydroxyl groups is smaller than 2 moles, the cross-linking is insufficient).

The film of the resin composition of the present invention contains, in addition to the above said base resin, silica and sparingly water soluble Cr compound as necessary components, and may include polyisocyanate compound and silan compound. The combinations thereof are, for example, as follows.

(1) Base resin+silica+sparingly water soluble Cr compound+polyisocyanate compound (2) Base resin+silica+sparingly water soluble Cr compound+polyisocyanate compound+silan compound (3) Base resin+silica+sparingly water soluble Cr compound The substrate or base resin/silica weight ratio is formed from 99/1 to 30/70, preferably from 90/10 to 50/50, especially preferably from 80/20 to 60/40. The mechanism of improving the anti-corrosive effect by incorporation of silica has not been completely elucidated, but it is presumed that $Zn^{2+}$ dissolved in a corrosive environment reacts with silica to form a stable corrosion product inhibiting pitting, whereby an improved anti-corrosive effect is attained for a long period.

If the amount incorporated of silica is smaller than the amount corresponding to the base resin/silica weight ratio of 99/1, no substantial corrosion resistance-improving effect is attained by incorporation of silica, and if the amount incorporated of silica is larger than the amount corresponding to the base resin/silica weight ratio of 30/70, the adhesion of the multi-layer coating comprising at least two layers is reduced.

In order to obtain a high anti-corrosive effect, it is preferred that silica be incorporated in an amount exceeding the amount corresponding to the base resin/-silica weight ratio of 90/10, especially 80/20.

If silica is incorporated in too large amount, the film is rendered porous, resulting in reduction of the adhesion of a multi-layering coating comprising at least two layer, and it is preferred that silica be incoporated in an amount not larger than the amount corresponding to the base or substrate resin/silica weight ratio of 50/50, especially 60/40.

As the silica that is used in the present invention, there can be mentioned colloidal silica, water-dispersible silica called "fumed silica" and hydrophobic silica. Attainment of an effect of improving the corrosion resistance is expected even by use of water-dispersible silica, but as described hereinafter, hydrophobic silica improves the corrosion resistance more prominently. It is preferred that the particle size of silica be 1 to 500 mμ, especially 5 to 100 mμ.

Coloidal silica or water-dispersible silica known as fumed silica has the surface covered with a hydroxyl group (silanol group-S-OH), and it shows hydrophilic properties. Since this silanol group is rich in the reactivity, it readily reacts with various organic compounds to render the surface of silica organic.

Hydrophobic silica is formed by substituting the silanol group on the surface of this water-dispersible silica partially or substantially completely with a methyl group or alkyl group to render the surface hydrophobic.

There are various methods for the production of hydrophobic silica. For example, there can be mentioned reactions using an organic solvent such as an alcohol, a ketone or an ester, a silane, a silazane or a polysiloxane. As the reaction method, there can be mentioned a method in which the reaction is carried out in an organic solvent under compression and a method in which heating is effected in the presence of a catalyst.

Silica has an excellent anti-corrosive effect, and hydrophobic silica is especially effective for improving the corrosion resistance. For example, in Japanese Patent Application Laid-Open Specific No. 224174/83 mentioned hereinbefore, it is taught that water-dispersible colloidal silica is added to an organic resin. However, since water-dispersible silica is highly hydrophilic, the compatibility with a solvent is poor, and because of this high hydrophilic characteristic, permeation of water is readily caused, resulting in reduction of the corrosion resistance, and it is presumed that initial rusting is readily caused in a wet environment.

Therefore, in the production of the steel plate of the invention, it is preferred that silica having the surface rendered hydrophobic (hydrophobic silica) be incorporated into the basic epoxy resin to increase the compatibility with the basic epoxy resin and obtain a high corrosion resistance.

As such hydrophobic silica, there can be mentioned (1) colloidal silica dispersed in an organic solvent such as methyl alcohol, ethyl alcohol, n-propyl alcohol, isopropyl alcohol, n-butyl alcohol, ethyl cellosolve or ethylene glycol (for example, OSCAL 1132, 1232, 1332, 1432, 1532, 1622, 1722 or 1724 supplied by Shokubai Kasei Kogyo), and (2) silica having the surface rendered hydrophobic by an organic solvent or a reactive silane compound, that is, hydrophobic ultrafine particulate silica (for example, R974, R811, R812, R805, T805, R202, RY200 or RX200 supplied by Nippon Aerosil).

Hydrophobic silica as described above is stably dispersed in the basic epoxy resin.

The sparingly water soluble Cr compound releases a slight amount of $Cr^{6+}$, which is then passivated to produce a corrosion proof effect. This effect is particularly remarkable in corrosive environments such as SST (Salt Spray Test) where continuous dissolution of the sparingly water soluble Cr compound occurs.

The sparingly water soluble Cr compound is incorporated in such an amount that the substrate resin/sparingly water soluble Cr compound weight ratio is in the range of from 99/1 to 60/40. If the amount of the sparingly water soluble Cr compund is smaller than the amount corresponding to the substrate resin/sparingly water soluble Cr compoundweight ratio of 99/1, improvement of the anti-corrosive effect cannot be expected by the incorporation. If the amount of the sparingly water soluble Cr compound is larger than the amount corresponding to the substrate resin/sparingly water soluble Cr compound weight ratio of 60/40, the adhesion of a multi-layer coating comprising at least two layers and the corrosion resistance are degraded by the water-absorbing action of the sparingly water soluble Cr compound.

In order to attain a highly improved anti-corrosive effect by incorporation of the sparingly water soluble Cr compound and assuredly prevent degradation of the adhesion and corrosion resistance of the multi-layer coating by excessive incorporation, it is preferred that the sparingly water soluble Cr compound be incorporated in such an amount that the base resin/sparingly water soluble Cr compound weight ratio is in the range of from 97/3 to 65/35, especially from 95/5 to 75/25.

Incidentally, when contained as the rust preventive in the resin film, sparingly water soluble Cr compound is expected to produce no appreciable corrosion-proof effect in accelerated corrosion tests wherein wet and dry conditions appear alternately, as is the case with CCT simulating an actual corrosive environment. In such tests, to use silica as the rust preventive is rather more effective. When accelerated tests are carried out with samples subjected to strong working or extremely sharp cutting, however, no sufficient reparing effect is produced on injured regions by incorporating only silica in the resin as the rust preventive.

According to the present invention, the silica and sparingly water soluble Cr compound different from each other in the corrosion-proof mechanism are contained in the resin in some specific proportions, thereby achieving improved corrosion resistance through their synergistic effects upon corrosion-proofness.

Reference will now be made to the results of corrosion resistance tests-cycle tests to be described in Examples 1 and 2 (sharp cutting, 100 cycles)—conducted with varied proportions of the base resin and the [silica+sparingly water soluble Cr compound] and varied proportions of the silica and sparingly water soluble Cr compound dispersed in the base resin.

In the tests, steels sheets electrodeposited on their one sides with a zine-nickel alloy (12% Ni-Zn) in an amount of 20 $g/m^2$ were used as the specimens. The chromate treatment was carried out under the conditions for the coating type chromate treatment, as will be described later, at a coating weight (on one sides) of 50 $mg/m^2$ calculated as Cr. Coating was carried out with a roll coater, followed by drying. As the base resins, solvent type epoxy resins (resins specified in under No. 2 in Table 4 and in Table 10 were used. The silica and sparingly water soluble Cr compound used were respectively fumed silica R811 manufactured by Nihon Aerosil and $BaCrO_4$ manufactured by Kikuchi Shikiso.

FIG. 1 shows the results of corrosion resistance tests wherein the weight ratio of the silica: the sparingly water soluble Cr compound was kept constant at 37:3, and the proportion of the base resin and the [silica+-sparingly water soluble Cr compound] was varied between 100:0 and 0:100 in weight ratio.

FIG. 2 shows the results of corrosion resistance tests wherein the weight ratio of the silica: the slightly soluble Cr compound was kept constant at 30:10, and the proportion of the base resin and the [silica+sparingly water soluble Cr compound] was varied between 100:0 and 0:100 in weight ratio.

FIG. 3 shows the results of corrosion resistance tests wherein the weight ratio of the silica: the sparingly water soluble Cr compound was kept constant at 20:20, and the proportion of the base resin and the [silica+-sparingly water soluble Cr compound] was varied between 100:0 and 0:100 in weight ratio.

FIG. 4 shows the results of corrosion resistance tests wherein the weight ratio of the base resin: the [silica+ sparingly water soluble Cr compound was kept constant at 75:75, and the weight ratio of the silica: sparingly water soluble Cr compound was varied between 40:0 and 0:40.

FIG. 5 shows the results of corrosion resistance tests wherein the weight ratio of the base resin: the [silica+-sparingly water soluble Cr compound] was kept constant at 60:40, and the weight ratio of the silica: the sparingly water soluble Cr compound was varied between 40:0 and 0:40.

FIG. 6 shows the results of corrosion resistance tests wherein the weight ratio of the base resin: the [silica+-sparingly water soluble Cr compound] was kept constant at 50:50, and the weight ratio of the silica: the sparingly water soluble Cr compound was varied between 40:0 and 0:40.

From FIGS. 1 to 6, it is evidend that it is possible to achieve improved corrosion resistance by controlling the respective components to the specific regions. More specifically, the optimum region of each component is as follows.

1. Weight Ratio of Substrate Resin: [Silica+Sparingly water soluble Cr Compound] 75:25 to 50:50, preferably 70:30 to 55:45
2. Weight Ratio of Silica: Sparingly water soluble Cr compound 37:3 to 20:20, preferably 35:5 to 25:15

When the amount of the silica and sparingly water soluble Cr compound is less than 75:25 as expressed in terms of the weight ratio of the base resin: the [silica+-sparingly water soluble Cr compound], no sufficient corrosion resistance is obtained. At 70:30 or higher, it is possible to obtain films having the best corrosion resistance. On the other hand, when the amount of the aforesaid additives exceeds 50:50, a problem arises in connection with corrosion resistance. At 55:45 or lower, improved corrosion resistance is achieved. Therefore, the optimum weight ratio of the base resin: the [silica+-sparingly water soluble Cr compound] is between 75:25 and 50:50, preferably 70:30 and 55:45.

When the weight ratio of the silica: sparingly water soluble Cr compound dispersed in the resin is less than 37:3, the problem that corrosion resistance is insufficient arises due to insufficient repairing effect of $Cr^6$. At 35:5 or higher, however, it is possible to obtain films having the best corrosion resistance.

When the amount of the silica added is less than 20:20 in terms of the aforesaid weight ratio, on the other hand, the formation of a stable corrosion product of silica and $Zn^{2+}$ is too unsatisfactory to obtain satisfactory corrosion resistance. Therefore, the optimum weight ratio of the silica: sparingly water soluble Cr compound to be contained in the resin is between 37:3 to 20:20, preferably 35:5 to 25:15.

As the sparingly water soluble Cr compound, use may be made of powdery barium chromate ($BaCrO_4$), strontium chromate ($SrCrO_4$), lead chromate ($PbCrO_4$), zinc chromate ($ZnCrO_4 \cdot 4Zn(OH)_2$), calcium chromate ($CaCrO_4$), potassium chromate ($K_2O \cdot 4ZnO \cdot 4CrO_3 \cdot 3H_2O$) and silver chromate ($AgCrO_4$). One or two or more of these compounds is or are dispersed in the base resin.

Other chromium compounds are inferior in the compatibility with the base resin, or are poor in the two-coat adhesion because soluble $Cr^{6+}$ is contained in a large amount, though they exhibit a certain anti-corrosive effect. Therefore, other chromium compounds are not suitable for attaining the objects of the present invention.

However, preference is given to $BaCrO_4$ and $SrCrO_4$ in view of the corrosion resistance of steel sheets designed to be subjected to strong working (e.g., drawbead testing) or extremely sharp cutting (width: about 1 mm).

When the surface-treated steel sheets obtained according to the present invention are actually used by the users, they may often be coated. When coating is carried out by automotive makers, pretreatments such as degreasing, surface regulation and phosphate treatments may be carried out, as occasion arises. The surfacetreated steel sheets obtained according to the present invention release Cr, although in slight amounts, at the pre-treatment steps for coating, since the chromate undercoat and the resin film contain soluble $Cr^6$. When discharging waste water produced at such pretreatment steps in surroundings, automotive makers disposes of that waste water, since its Cr concentration is regulated by an environmental standard. Due to certain limitation imposed upon the ability of waste water disposal plants, however, it is preferred that the amount of elution of Cr is reduced.

Of the sparingly water soluble Cr compounds incorporated into the substrate resin, $BaCrO_4$ releases Cr at the pre-treatment steps in an amount smaller than do other chromium compounds. In view of the elution of Cr, therefore, it is preferred to use $BaCrO_4$.

In the corrosion resistance tests conducted for the determination of the weight ratios of the base resin to the [silica+slightly soluble Cr compound] and the silica to the sparingly water soluble Cr compound, hydrophobic fumed silica R 811 manufactured by Nihon Aerosil was used. However, similar results were obtained with the already mentioned other hydrophobic silica irrespectively of whether or not the polyisocyanate compound is included, provided that the weight ratio of the base resin: the [silica+sparingly water soluble Cr compound] was in the range of 75:25 to 50:50 and the weight ratio of the silica: sparingly water soluble Cr compound was in the range of 37:3 to 20:20.

$BaCrO_4$ was used as sparingly water soluble Cr compound, but similar results were obtained even with the use of other compounds, e.g., $SrCrO_4$, $AgCRO_4$, $PbCrO_4$, $CaCrO_4$, $K_2O{\cdot}4ZnO{\cdot}4CrO_3{\cdot}3H_2O$ and $ZnCrO_4{\cdot}4Zn(OH)_2$ alone or in any combination, provided that the weight ratio of the base resin: the silica+-sparingly water soluble Cr compound] was in the range of 75:25 to 50:50, and the weight ratio of the silica: the sparingly water soluble Cr compound was in the range of 37:3 to 20:20.

As curing means for forming the film of the present invention, there is preferably adopted a mathod in which urethanation reaction between the isocyanate and the hydroxyl group in the base resin in a main reaction. For this reaction, a polyisocyanate compound is incorporated.

In order to stably store the resin composition before formation of the film, it is necessary to protect the isocyanate of the curing agent. As the protecting means, there may be adopted a method in which the polyisocyanate compound is protected so that the protecting group is isolated by heating to regenerate the isocyanate group.

As the polyisocyanate compound, there can be used aliphatic isocyanates, alicyclic isocyanates (inclusive of heterocyclic isocyanates) and aromatic isocyanates having at least two isocyanate groups in one molecule, and compounds obtained by partially reacting these isocyanate compounds with a polyhydric alcohol. For example, there can be mentioned (1) m-phenylene diisocyanate, p-phenylene diisocyanate, 2,4-tolylene diisocyanate, 2,6-tolylene diisocyanate, p-xylene diisocyanate, hexamethylene diisocyanate, dimer acid diisocyanate and isophorone diisocyanate, and (2) reaction products obtained by reacting at least one member selected from the compounds mentioned in (1) above with a polyhydric alcohol (for example, a dihydric alcohol such as ethylene glycol or propylene glycol, a trihydric alcohol such as glycerol or trimethylolpropane, a tetrahydric alochol such as pentaerythritol or a hexahydric alcohol such as sorbitol or dipentaerythritol), which have at least 2 isocyanate groups left in one molecule.

As the protecting agent (blocking agent) for the polyisocyanate compound, there can be mentioned, for example, (1) aliphatic alcohols such as methanol, ethanol, propanol, butanol and octyl alcohol, (2) monoethers of ethylene glycol and/or diethylene glycol, such as methyl, ethyl, propyl (n- and iso) and butyl (n-, iso- and sec-) monoethers, (3) aromatic alcohols such as pheno and cresol, and (4) oximes such as acetoxime and methylethyl ketone oxime. By reacting the above-mentioned polyisocyanate compound with at least one compound selected from the foregoing compounds, a polyisocyanate compound protected stably at least under normal temperature conditions can be obtained.

It is preferred that the polyisocyanate compound as the curing agent be incorporated in an amount of 5 to 80 parts, especially 10 to 50 parts, per 100 parts by the base resin (as the solid). Since the polyisocyanate compound has a water-absorbing property, if the polyisocyanate compound is incorporated in an amount exceeding 80 parts, the adhesion is degraded. Furthermore, if the surface-treated steel plate for a car body is subjected to the electrodeposition coating or spray coating operation, the unreacted polyisocyanate compound migrates into the coating to inhibit curing of the coating and degrade the adhesion. In view of the foregoing, it is preferred that the polyisocyanate compound be incorporated in an amount of up to 80 parts by weight per 100 parts by weight of the base resin.

An alkyl-etherified amino resin obtained by reacting a methylol compound, formed by reacting at least one member selected from melamine, urea and benzoguanamine with formaldehyde, partially or completely with a monohydric alcohol having 1 to 5 carbon atoms may be used as the crosslinking agent in combination with the polyisocyanate compound.

The resin can be sufficiently crosslinked by the abovementioned crosslinking agent. In order to further increase the low-temperature crosslinking property, it is preferred that a known curing promoting catalyst be used in combination with the curing agent. As the curing promoting catalyst, there can be mentioned, for example, N-ethylmorpholine, dibutyl tin laurate, cobalt naphthenate, stannous chloride, zinc naphthenate and bismus nitrate. Moreover, a known resin such as an acrylic resin, an alkyd resin or a polyester may be incorporated into the resin composition for improving certain physical properties such as the adhesiveness.

If the polyisocyanate compound is used as the curing agent, a sufficiently dense film having a high crosslinking degree can be obtained by low-temperature curing.

The resin composition film may further comprise a silane compound, that is, a monomer or oligomer of a di- or tri-alkoxysilane compound in addition to polyisocyanate compound.

It is construed that the silane compound acts as a crosslinking agent between the basic epoxy resin and the silica component More specifically, if the silane compound is added, the crosslinking density is increased in the resin film and a strong barrier film is formed. Accordingly, the bare corrosion resistance is improved and damage of the film by working is decreased, and it is presumed that for this reason, the corrosion resistance after working is improved.

Moreover, the silane compound enhances the adhesion force in the interface between the chromate film and the resin and the adhesion force in the interface between the silica component and the resin, with the result that permeation of water in a wet environment is prevented and the corrosion resistance after the coating operation is improved.

As the silane compound, there can be mentioned divinyldimethoxysiane, divinyldi-β-methoxyethoxysilane, di(γ-glycidopropyl)dimethoxysilane, vinyltriethoxysilane, vinyltris-β-methoxyethoxysilane, γ-glycidopropyltrimethoxysilane, β-(3,4-epoxychlorohexyl)ethyltrimethoxysilane, N-β-aminoethyl-γ-propylmethyldimethoxysilane, N-β-aminoethyl-γ-propyltrimethoxysilane, β-aminopropyltriethoxysilane, and oligomers thereof.

The silane compound is incorporated in an amount of 0.1 to 15 parts, preferably 0.5 to 10 parts, per 100 parts of the sum of the solids of the basic epoxy resin and silica component. If the amount of the silane compound is smaller than 0.1 part, no substantial effect can be attained by incorporation of the silane compound, and if the amount of the silane compound is larger than 15 parts, increase of the effect corresponding to increase of the amount incorporated cannot be attained but the process becomes disadvantageous from the economical viewpoint.

The resin composition may comprise other additives and pigments (chromium type rust-preventive pigments, non-chromium-type rust-preventive pigment, extender pigments, coloring pigments and the like).

The resin composition film is obtained by coating the above-mentioned resin composition in a predetermined thickness by a roll squeezing method, a roll coating method or an air knife coating method, and, if the polyisocyanate compound is contained, heat-baking the coating at a plate temperature of 60° to 250° C., preferably 70° to 200° C. The steel plate of the present invention is characterized in that it can be obtained by such low-temperature baking.

If the baking temperature is lower than 60° C., cross-linking of the film is not advanced and no sufficient corrosion resistance can be obtained. If the baking temperature exceeds 250° C., the corrosion resistance is degraded as in Japanese Patent Application Laid-Open Specification No. 174879/85 mentioned hereinbefore. It is presumed that if the baking temperature exceeds 250° C., by evaporation of water contained in the chromate film and abrupt advance of dehydration condensation of hydroxyl groups (—Cr—OH), destruction of the chromate film is advanced by formation of cracks in the chromate film and by reduction of $CR^{6+}$, the passivating action is weakened.

In case of the resin composition film not containing the polyisocyanate compound, after coating, the film is dried with hot air at a plate temperature of normal temperature to 250° C., preferably normal temperature to 170° C., whereby a dry film is obtained within several seconds to several minutes. The method for drying the film is not limited to the hot air drying method.

The above-mentioned resin composition film of the present invention is formed on the chromate film in an amount deposited of 0.1 to 3.5 g/m², preferably 0.3 to 2.0 g/m². If the amount deposited of the resin film is smaller than 0.1 g/m², no sufficient corrosion resistance can be obtained, and if the amount deposited of the resin film is larger than 3.5 g/m², the weldabilty (especially, the adaptability to continuous multi-spot welding) is reduced. Accordingly, a deposited amount in the range of 0.1 to 3.5 g/m² is preferred for a highly corrosion-resistant surface-treated steel body for a car body.

Cation electrodeposition is effected on a car body. If the wet electric resistance of the chromate film plus the resin composition film exceeds 200 KΩ/cm², a cation electrodeposition coating is not formed in a good condition. Accordingly, in the steel plate of the present invention, which is used mainly for a car body, it is preferred that the chromate film and resin composition film be formed so that the wet electric resistance of the chromate film plus the resin composition film is controlled below 200 KΩ/cm².

The present invention includes a steel plate having the above-mentioned film structure on one or both of the surfaces. For examples, the steel plate of the present invention includes the following embodiments.

(1) One surface: deposited metal film/chromate film/resin composition film
Other surface: Fe surface (2) One surface: deposited metal film/chromate film/resin composition film
Other surface: deposited metal film (3) Both surfaces: deposited metal film/chromate film/resin composition film It is understood that the highly corrosion-resistant surface-treated steel plates according to the present invention cannot only be used in automative applications, but are also applicable to household electric appliances and building materials.

EXAMPLE 1

Adhesion and corrosion resistance tests were carried out with the steel plates of the present invention which were designed for steel plates corresponding to the inner face of an automotive body and differed in the deposited metal components and the film deposition amount, as shown in Table 1. Comparative steel plates shown in Table 2 were similarly tested.

The deposited metal components of the steel plates were shown in Table 3. Each steel plate having a chromate film and a basic epoxy resin, shown in the tables, were prepared by alkali-degreasing, water-washing and drying a metal-deposited steel plate, coating the steel plate with a coating type chromate treatment liquid by a roll coater or dipping the steel plate in an electrolytic chromate treatment bath to form an electrolytic chromate film, followed by drying, and coating the steel plate with a basic epoxy resin liquid by a roll coater for the formation of a second film layer. After drying, the steel plate was heat-treated and air-cooled.

The coating type chromate treatment, the electrolytic chromate treatment and the basic expoxy resin liquid will now be described in detail.

Coating Type Chromate Treatment Conditions

Chromate liquid of $Cr^{3+}/Cr^{6+} = \frac{2}{3}$ and pH=2.5 (adjusted with KOH) was coated by the roll coater at the room temperature and dried.

Electrolytic Chromate Treatment Conditions

In a bath containing 50 g/l of $CrO_3$ and 0.5 g/l of $H_2SO_4$ and maintained at 50° C., cathodic electrolysis was carried out at a current density of 4.9 A/dm² for times varied depending upon the target amount of chromium deposited. The product were then washed with water and drying.

Resin composition

A base resin prepared according to procedures described below was mixed with a curing agent at a ratio shown in Table 3 to form a resin composition.

Substrate resin (I) A reaction vessel equipped with a reflux cooler, a stirrer, a thermometer and a nitrogen-blowing device was charged with 1600 g of Epikote 1004 (epoxy resin supplied by Shell Chemical, molecular weight=about 1600), 57 g of pelargonic acid and 80 g of xylene, and reaction was carried out at 170° C. until the acid value of the reaction product was reduced to 0. Xylene was removed under reduced pressure to obtain a reaction intermediate [A].

(II) A reaction vessel equipped with a stirrer, a reflux cooler, a thermometer and a liquid dropping funnel was charged with 1880 g (0.5 mole) of Epikote 1009 (epoxy resin supplied by Shell Chemical, molecular weight=3750) and 1000 g of a methylisobutylketone/xylene mixed solvent (1/1 weight ratio), and the content was heated with stirring and the resin was homogeneously dissolved at the boiling point of the solvent. Then, the solution was cooled to 70° C. and 70 g of di(n-propanol)amine contained in the liquid dropping funnel was dropped to the solution in the reaction vessel over a period of 30 minutes. During this period, the reaction temperature was maintained at 70° C. After the dropwise addition, the reaction mixture was maintained at 120° C. for 2 hours to complete the reaction and obtain a resin A. The content of the effective component in the resin A was 66%.

(III) The same reaction vessel as used in (II) above was charged with 1650 g of the reaction intermediate [A] obtained in (I) above and 1000 g of xylene, and the content was heated at 100° C. and 65 g of diethanolamine and 30 g of monoethanolamine contained in the liquid dropping funnel were dropped into the reaction vessel over a period of 30 minutes. Then, the reaction mixture was maintained at 120° C. for 2 hours to complete the reaction and obtain a resin B. The content of the effective component in the resin B was 63%.

Curing agent (I) A reaction vessel equipped with a thermometer, a stirrer and a reflux cooler was charged with 250 parts of 4,4-diphenylmethane diisocyanate and 50 parts of diisobutylketone, and they were homogeneously mixed together. Then, 184 parts of ethylene glycol monoethyl ether was added to the mixture, and reaction was carried out for 2 hours at 90° C. and for 3 hours at 110° C. to obtain a completely urethanated curing agent a. The content of the effective component in the curing agent a was 89%.

(II) A reaction vessel equipped with a thermometer, a stirrer and a reflux cooler provided with a dropping funnel was charged with 222 parts of isophorone diisocyanate, and 100 parts of methylisobutylketone was added to form a homogeneous solution. Then, 88 parts of a 50% solution of trimethylolpropane in methylisobutylketone was dropped from the dropping funnel to the isocyanate solution being stirred at 70° C. over a period of 1 hour. Then, the reaction mixture was maintained at 70° C. for 1 hour and at 90° C. for 1 hour. Then, 230 parts of n-butyl alcohol was added and reaction was carried out at 90° C. for 3 hours to obtain a blocked isocyanate designated as curing agent b. The content of the effective component in the curing agent b was 76%.

Some tests were carried out, as described below.

Adhesion Test

A phosphate-treated sample was subjected to electrodeposition coating with a cation electrodeposition paint, U-50 supplied by Nippon Paint, to form a film having a thickness of 20μ, and Amilac No. 002 supplied by Kansai Paint was spray-coated in a thickness of 30μ to form a two-coat coating. Separately, S-93 Sealer supplied by Nippon Paint was coated in a thickness of 40μ on the above-mentioned electrodeposition coating film and Amilac #805 White supplied by Kansai Paint was further coated in a thickness of 40μ to form a three-coat coating. The primary adhesion and secondary adhesion were tested at the adhesion test. At the primary adhesion test, 100 square cuts were formed at intervals of 1 mm on the coating surface of the sample, and an adhesive tape was applied to the cut surface and was then peeled. At the secondary adhesion test, the coated sample was immersed in warm water (pure water) at 40° C. for 120 hours, and within 30 minutes, cut squares were formed at intervals of 1 mm in the same manner as described above, and an adhesive tape was applied to the cut surface and was then peeled.

Corrosion Resistance Test

Some tests, as mentioned below, were carried out according to a cycle test comprising a cycle of the following steps.

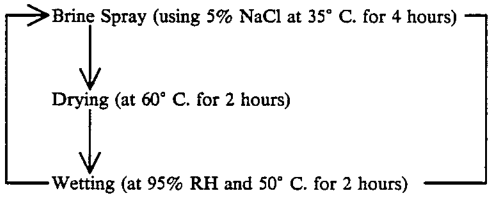

Flat Plate CCT

Samples in the form of a flat plate were used as such, and were tested until 300 cyclces.

Sharply Cut CCT

Samples in the form of a flat plate were provided over their entire surface with sharp cuts (in the form of crosscuts of about 1 mm in width), and were tested until 100 cycles.

Post-Working CCT

For severer estimation than in Example 1, specimens were subjected to draw-beading tests under the following conditions (bead's apex diameter: 0.25 mm), and were tested until 100 cycles.

Bead's Shape: Apex Angle—60°, Apex R—0.25, Bead's Height—5 mm.
Sample's Size: 25 mm×300 mm
Draw-up Speed: 200 mm/min.
Pressing Force: 500 kg

Cr Elution Test

With 1 l of a liquid degreasing agent FC-4410 manufactured by Nippon Parker Rising, 0.6 $m^2$ of each speciment were degreased under standard conditions to determine the amount of Cr in that liquid by atomic absorption.

The results of various tests were estimated on the following bases.

(1) Corrosion Resistance (common to flat plate, post-working and sharp cutting tests)

⊙: No red rust found.

○+: Less than 5% of red rust found.

○: 5% to less than 10% of red rust found.

Δ: 10% to less than 50% of red rust found.

X: 50% or more of red rust found.

(2) Double- or Triple-Coat Adhesion

Two-coat or three-coat adhesion

⊙: peeled area ratio of 0%

○+: peeled area ratio smaller than 5%

○: peeled area ratio of 5 to 10%

○−: peeled area ratio of 10 to 20%

Δ: peeled area ratio of 20 to 50%

X: peeled area ratio larger than 50%

(3) Cr Elusion

⊙: Less than 2 ppm of Cr found in the degreasing liquid.

○: 2 ppm to less than 6 ppm of Cr found in the degreasing liquid.

Δ: 6 ppm to less than 12 ppm of Cr found in the degreasing liquid.

X: 12 ppm or higher of Cr found in the decreasing liquid.

TABLE 1

| No | Base Sheet (*6) | Cr film Type | Cr film A | Resin Film R (*1) | Silica Component Type *2 | Silica Component C | D Type *3 | D E | E*4 | F*5 | G | H | Corrosion resistance I | Corrosion resistance J | Corrosion resistance K | Cr elusion | L M | L IV | O M | O N | Remarks |
|---|---|---|---|---|---|---|---|---|---|---|---|---|---|---|---|---|---|---|---|---|---|
| Examples of Invention | | | | | | | | | | | | | | | | | | | | | |
| 1 | B | S | 50 | (2) | (1) | 67/33 | (4) | 86/14 | 60/40 | 30/10 | 1.0 | 60 | ◎ | ◎ | ◎ | O | ◎ | O | ◎ | O | |
| 2 | " | " | " | " | " | " | " | " | " | " | " | 80 | ◎ | ◎ | ◎ | ◎ | ◎ | ◎ | ◎ | ◎ | |
| 3 | " | " | " | " | " | " | " | " | " | " | " | 150 | ◎ | ◎ | ◎ | ◎ | ◎ | ◎ | ◎ | ◎ | |
| 4 | " | " | " | " | " | " | " | " | " | " | " | 200 | ◎ | ◎ | ◎ | ◎ | ◎ | ◎ | ◎ | ◎ | |
| 5 | " | " | " | " | " | " | " | " | " | " | " | 250 | ◎ | ◎ | ◎ | ◎ | ◎ | ◎ | ◎ | ◎ | |
| 6 | " | " | " | " | " | " | " | " | " | " | 0.1 | 150 | ◎ | ◎ | ◎ | ◎ | ◎ | ◎ | ◎ | ◎ | |
| 7 | " | " | " | " | " | " | " | " | " | " | 0.3 | " | ◎ | ◎ | ◎ | ◎ | ◎ | ◎ | ◎ | ◎ | |
| 8 | " | " | " | " | " | " | " | " | " | " | 2.0 | " | ◎ | ◎ | ◎ | ◎ | ◎ | ◎ | ◎ | ◎ | |
| 9 | " | " | " | " | " | " | " | " | " | " | 3.5 | " | ◎ | ◎ | ◎ | ◎ | ◎ | ◎ | ◎ | ◎ | P |
| 10 | " | " | " | " | " | 80/20 | " | 92/8 | 75/25 | " | 1.0 | " | ◎ | O+ | O+ | ◎ | ◎ | ◎ | ◎ | ◎ | |
| 11 | " | " | " | " | " | 76/24 | " | 90/10 | 70/30 | " | " | " | ◎ | ◎ | ◎ | ◎ | ◎ | ◎ | ◎ | ◎ | |
| 12 | " | " | " | " | " | 62/38 | " | 83/17 | 55/45 | " | " | " | ◎ | ◎ | ◎ | ◎ | ◎ | ◎ | ◎ | ◎ | |
| 13 | " | " | " | " | " | 57/43 | " | 80/20 | 50/50 | " | " | " | ◎ | O+ | O+ | ◎ | ◎ | ◎ | ◎ | ◎ | |
| 14 | " | " | " | " | " | 62/38 | " | 95/5 | 60/40 | 37/3 | " | " | ◎ | O+ | O+ | ◎ | ◎ | ◎ | ◎ | ◎ | |
| 15 | " | " | " | " | " | 63/37 | " | 92/8 | " | 35/5 | " | " | ◎ | ◎ | ◎ | ◎ | ◎ | ◎ | ◎ | ◎ | |
| 16 | " | " | " | " | " | 71/29 | " | 80/20 | 60/40 | 25/15 | 1.0 | 150 | ◎ | ◎ | ◎ | ◎ | ◎ | ◎ | ◎ | ◎ | |
| 17 | " | " | " | " | " | 75/25 | " | 75/25 | " | 20/20 | " | " | ◎ | O+ | O+ | ◎ | ◎ | ◎ | ◎ | ◎ | |
| 18 | " | " | " | " | (2) | 67/33 | " | 86/14 | " | 30/10 | " | " | ◎ | ◎ | ◎ | ◎ | ◎ | ◎ | ◎ | ◎ | |
| 19 | " | " | " | " | (3) | " | " | " | " | " | " | " | ◎ | ◎ | ◎ | ◎ | ◎ | ◎ | ◎ | ◎ | |
| 20 | " | " | " | " | (4) | " | " | " | " | " | " | " | ◎ | ◎ | ◎ | ◎ | ◎ | ◎ | ◎ | ◎ | |
| 21 | " | " | " | " | (1) | " | (1) | " | " | " | " | " | ◎ | ◎ | ◎ | O | ◎ | ◎ | ◎ | ◎ | |
| 22 | " | " | " | " | " | " | (2) | " | " | " | " | " | ◎ | O+ | O+ | O | ◎ | ◎ | ◎ | ◎ | |
| 23 | " | " | " | " | " | " | (3) | " | " | " | " | " | ◎ | O+ | O+ | ◎ | ◎ | ◎ | ◎ | ◎ | |
| 24 | " | " | " | " | " | " | (5) | " | " | " | " | " | ◎ | O+ | O+ | ◎ | ◎ | ◎ | ◎ | ◎ | |
| 25 | " | " | " | " | " | " | (6) | " | " | " | " | " | ◎ | O+ | O+ | O | ◎ | ◎ | ◎ | ◎ | |
| 26 | B | | 50 | (2) | (1) | 67/33 | (8) | 86/14 | 60/40 | 30/10 | 1.0 | 150 | ◎ | O+ | O+ | O | ◎ | ◎ | ◎ | ◎ | |
| 27 | " | " | " | (1) | " | " | (4) | " | " | " | " | " | ◎ | O+ | O+ | ◎ | O+ | O+ | O | O | |
| 28 | " | " | " | (3) | " | " | " | " | " | " | " | " | ◎ | ◎ | ◎ | ◎ | ◎ | ◎ | ◎ | ◎ | |
| 29 | " | " | " | (4) | " | " | " | " | " | " | " | " | ◎ | ◎ | ◎ | ◎ | ◎ | ◎ | ◎ | ◎ | |
| 30 | " | " | " | (5) | " | " | " | " | " | " | " | " | ◎ | O+ | O+ | O | O+ | O+ | O | O | |
| 31 | " | " | " | (8) | " | " | " | " | " | " | " | " | ◎ | ◎ | ◎ | ◎ | ◎ | ◎ | ◎ | ◎ | |
| 32 | " | " | " | (9) | " | " | " | " | " | " | " | " | ◎ | ◎ | ◎ | ◎ | ◎ | ◎ | ◎ | ◎ | |
| 33 | " | " | " | (10) | " | " | " | " | " | " | " | " | ◎ | O | O | ◎ | O+ | O+ | O | O | |
| 34 | " | " | 10 | (2) | " | " | " | " | " | " | " | " | ◎ | O+ | O+ | ◎ | ◎ | ◎ | ◎ | ◎ | |
| 35 | " | " | 30 | " | " | " | " | " | " | " | " | " | ◎ | ◎ | ◎ | ◎ | ◎ | ◎ | ◎ | ◎ | |
| 36 | " | " | 80 | " | " | " | " | " | " | " | " | " | ◎ | ◎ | ◎ | ◎ | ◎ | ◎ | ◎ | ◎ | |
| 37 | " | " | 200 | " | " | " | " | " | " | " | " | " | ◎ | ◎ | ◎ | O | ◎ | ◎ | ◎ | ◎ | Q |
| 38 | " | T | " | " | " | " | " | " | " | " | " | " | ◎ | ◎ | ◎ | ◎ | ◎ | ◎ | ◎ | ◎ | |
| 39 | A | S | 50 | " | " | " | " | " | " | " | " | " | O+ | O+ | O+ | ◎ | ◎ | ◎ | ◎ | ◎ | |
| 40 | C | " | " | " | " | " | " | " | " | " | " | " | O | O | O | ◎ | ◎ | ◎ | ◎ | ◎ | |
| 41 | D | | 50 | (2) | (1) | 67/33 | (4) | 86/14 | 60/40 | 30/10 | 1.0 | 150 | O+ | O+ | O+ | ◎ | ◎ | ◎ | ◎ | ◎ | |
| 42 | E | " | " | " | " | " | " | " | " | " | " | " | O | O | O | ◎ | ◎ | ◎ | ◎ | ◎ | |
| 43 | F | " | " | " | " | " | " | " | " | " | " | " | O+ | O+ | O+ | ◎ | ◎ | ◎ | ◎ | ◎ | |
| 44 | G | " | " | " | " | " | " | " | " | " | " | " | ◎ | ◎ | ◎ | ◎ | ◎ | ◎ | ◎ | ◎ | |
| 45 | B | " | " | " | " | 92/8 | " | 97/3 | 90/10 | " | " | " | Δ | X | X | ◎ | ◎ | ◎ | ◎ | ◎ | |
| 46 | " | " | " | " | " | 47/53 | " | 73/27 | 40/60 | " | " | " | Δ | Δ | Δ | Δ | O | Δ | O | O | Δ |

TABLE 1-continued

| | | | | Resin Film | | | | | | | | | | | | | | | | | |
|---|---|---|---|---|---|---|---|---|---|---|---|---|---|---|---|---|---|---|---|---|---|
| | Base Sheet | Cr film | | R | Silica Component | | D | | | | | | Corrosion resistance | | | Cr | L | | O | | |
| No | (*6) | Type | A | (*1) | Type *2 | C | Type *3 | E | E*4 | F*5 | G | H | I | J | K | elusion | M | IV | M | N | Remarks |
| 47 | " | " | " | " | " | 86/14/ | " | 67/33 | 60/40 | 10/30 | " | " | Δ | Δ | Δ | Δ | ◎ | ◎ | ◎ | ◎ | |
| 48 | " | " | " | " | (5) | 67/33 | " | 86/14 | " | 30/10 | " | " | Δ | X | X | ◎ | ◎ | ◎ | ◎ | ◎ | |
| 49 | " | " | 1 | " | (1) | " | " | " | " | " | " | " | O | Δ | Δ | O | O | O | O | O | |
| 50 | " | " | 300 | " | " | " | " | " | " | " | " | " | O | O | O | X | O | O | O | O | U |

Note
A: Chromium deposit amount ($mg/m^2$); R: Substrate resin; C: Substrate resin/Silica (wt ratio)
D: Sparingly water soluble Cr compound; E: Substrate resin/Cr compound (wt ratio)
F: Silica/Cr compound; G: Deposit amount ($g/m^2$)
H: Baking temperature (°C.); I: Plain sheet; J: Post-working;
K: Sharply cut CCT; L: 2-coat adhesion; M: Initial adhesion; N: Adhesion in warm water
O: 3-coat adhesion; P: Slightly inferior spot/weldability; Q: Slightly inferior weldability
S: Coating type; T: Electrolitic type;
U: Inferior weldability

TABLE 2

| No | Base Sheet (*6) | Cr film Type | Cr film A | Resin Film R (*1) | Silica component Type *2 | Silica component C | D Type *3 | D E | E *4 | E *5 | G | H | Corrosion Resistance I | Corrosion Resistance J | Corrosion Resistance K | Cr elusion | L M | L N | O M | O N | Remarks |
|---|---|---|---|---|---|---|---|---|---|---|---|---|---|---|---|---|---|---|---|---|---|
| Examples of comparison | | | | | | | | | | | | | | | | | | | | | |
| 1 | B | S | 50 | (2) | (1) | 67/33 | (4) | 86/14 | 60/40 | 30/10 | 1.0 | | ○ | ○ | ○ | X | ○ | Δ | ○ | Δ | |
| 2 | " | " | " | " | " | " | " | " | " | " | " | 300 | ○ | ○ | ○ | ◎ | ◎ | ◎ | X | X | |
| 3 | " | " | " | " | " | " | " | " | " | " | 0.05 | 150 | X | X | X | Δ | — | — | — | — | |
| 4 | " | " | " | " | " | " | " | " | " | " | 5.0 | " | ◎ | ◎ | ◎ | ◎ | ◎ | ◎ | ◎ | ◎ | U |
| 5 | " | " | " | " | " | 60/40 | — | — | 60/40 | 40/ 0 | 1.0 | " | Δ | Δ | Δ | ◎ | ◎ | ◎ | ◎ | ◎ | |
| 6 | " | " | " | " | " | 67/33 | (7) | 86/14 | " | 30/10 | " | " | Δ | X | X | X | ◎ | ◎ | ◎ | ◎ | |
| 7 | " | " | " | (11) | — | — | — | — | — | — | " | 260 | ◎ | Δ | Δ | ◎ | ○+ | ○+ | Δ | X | |
| 8 | | | | | | Zinchrometal | | | | | | | X | X | X | ◎ | ◎ | ◎ | ◎ | ◎ | |
| 9 | B | S | 50 | (6) | (1) | 67/33 | (4) | 86/14 | 60/40 | 30/10 | 1.0 | 150 | ○ | ○ | ○ | ◎ | ○– | ○– | X | X | |
| 10 | " | " | " | (7) | " | " | " | " | " | " | " | " | ○ | Δ | Δ | ◎ | ◎ | ◎ | X | X | |

Note
A through U: Same as those of Table 1
(*1) Refer to Table 4
(*2) Refer to Table 5
(*3) Refer to Table 6
(*4) Weight ratio of Substrate resin and [Silica + Sparingly water soluble Cr compound], i.e., Substrate resin/[Silica + Sparingly water soluble Cr compound]
(*5) Weight ratio of silica and sparingly water soluble Cr compound dispersed in resin, i.e., Silica/Sparingly water soluble Cr compound
(*6) Refer to Table 3

TABLE 3

| | Plated sheets | |
|---|---|---|
| A | Galvanization | (40 $g/m^2$) |
| B | Electric Zinc-alloy plating | (12% Ni—Zn, 20 $g/m^2$) |
| C | " | (25% Fe—Zn, 40 $g/m^2$) |
| D | Hot-dip Zn plating | (90 $g/m^2$) |
| E | Hot-dip Zn-alloy P. | (10% Fe—Zn, 45 $g/m^2$) |
| F | " | (5.0% Al—0.5% Mo, 90 $g/m^2$) |
| G | Electric Zinc-alloy plating | (60% Mn—Zn, 20 $g/m^2$) |

TABLE 6

| No. | Cr compounds | |
|---|---|---|
| 1 | $SrCrO_4$ | (Kikuchi Shikiso Kogyo) |
| 2 | $PbCrO_4$ | (") |
| 3 | $ZnCrO_4.4Zn(OH)_2$ | (") |
| 4 | $BaCrO_4$ | (") |
| 5 | $CaCrO_4$ | (") |
| 6 | $K_2O.4ZnO.4CrO_3.3H_2O$ | (") |
| 7 | $K_2CrO_4$ | (Nihon Kagaku Kogyo) |
| 8 | $AgCrO_4$ | (Kanto Kagaku) |

TABLE 4

| No. | Base resin | Curing agent | Catalyst |
|---|---|---|---|
| 1 | A 100 parts | a 25 parts | Bibutyl tin dilaurate 0.2 parts |
| 2 | A 100 parts | a 25 parts | Bibutyl tin dilaurate 1.0 part |
| 3 | A 100 parts | a 25 parts | — |
| 4 | A 100 parts | a 50 parts | Bibutyl tin dilaurate 2.0 parts |
| 5 | A 100 parts | a 80 parts | Bibutyl tin dilaurate 3.2 parts |
| 6 | A 100 parts | a 100 parts | Bibutyl tin dilaurate 4.0 parts |
| 7 | A 100 parts | — | — |
| 8 | A 100 parts | b 10 parts | Bismuth nitrate 1.0 part |
| 9 | B 100 parts | b 20 parts | N—ethyl marpoline 2.0 parts |
| 10 | Product obtained by adding 30 g/l of acetic acid to base resin A obtained in "Substrate Resin (II) to render it water soluble. | | |
| 11 | Organic composite silicate (silica sol content = 40%, acrylic silicate/epoxy silicate ratio = 30/70) prepared according to Japanese Patent Application Laid-Open Specification No. 174879/85 | | |

TABLE 5

| | |
|---|---|
| 1 | Hydrophobic ultra-fine particulate silica (supplied by Nihon Aerozil Sha R 811) |
| 2 | Hydrophobic ultra-fine particulate silica (supplied by Nihon Aerozil Sha R 805) |
| 3 | Collidal silica dispersed in organic solvent (OSCAL 1432 supplied by Shokubai Kasei Kogyo Sha) |
| 4 | Collidal silica dispersed in organic solvent (OSCAL 1622 supplied by Shokubai Kasei Kogyo Sha) |
| 5 | Hydrophilic silica (fumed silica) (200 supplied by Nihon Aerozil Sha 200) |

According to the steel plates of the present invention obtained in the foregoing examples, their uppermost layers are each formed of a strong barrier film possessing a high crosslink density and a high degree of alkali resistance, wherein the basic epoxy resin is used as the base resin and the silica component and hardly soluble Cr compound are added thereto as the additives. In addition, excellent corrosion resistance can be imparted to the chromate films per se without causing deterioration thereof and reduction of $Cr^{6+}$, since the resin is capable of being cured at low temperatures.

In the present invention, excellent post-working corrosion resistance is achieved especially on portions subjected to severe working through the synergistic effects of the silica component and hardly soluble Cr compound incorporated into the base resin in the predetermined proportion. In view of corrosion resistance in particular, it is preferable to incorporate the hydrophobic silica and hardly soluble Cr compound into the base resin in the silica:hardly soluble Cr compound ratio in weight ranging from 35:5 to 25:15, and use $BaCrO_4$ and $SrCrO_4$ as the hardly soluble Cr compound.

In view of Cr elution, preference is given to $BaCrO_4$, $ZnCrO_4.4Zn(OH)_2$ and $CaCrO_4$. In order to achieve the most excellent quality/performance combination (esp., corrosion resistance and Cr elution), therefore, the hydrophobic silica and $BaCrO_4$ may be dispersed in the substrate resin in the weight ratio ranging from 35:5 to 25:15.

EXAMPLE 2

Adhesion and corrosion resistance tests were carried out with the steel plates of the present invention which were designed for steel plates corresponding to the inner face of an automotive body and differed in the deposited metal component and the film deposition amount, as shown in Table 7. Comparative steel plates shown in Table 8 were similarly tested.

The deposited metal components of the steel plates were shown in Table 9. Each steel plate having a chromate film and a basic epoxy resin, shown in the tables, was prepared by alkali-degreasing, water-washing and drying a metal-deposited steel plate, coating the steel plate with a coating type chromate treatment liquid by a roll coater or dipping the steel plate in an electrolytic chromate treatment bath to form an electrolytic chromate film, followed by drying, and coating the steel plate with a basic epoxy resin liquid for the formation of a second film layer by a roll coater. After drying, the steel plate was heat-treated and air-cooled.

The coating type chromate treatment, the electrolytic chromate treatment and the basic expoxy resin liquid will now be described in detail.

Coating Type Chromate Treatment Conditions

Same as in Example 1.

Electrolytic Chromate Treatment Conditions

Same as in Example 1.

Resin Composition

The substrate resin and the curing agent prepsred as under were mixed at ratios of Table 10 to form resin composition.

The respective tests were carried out, as described below.

Adhesion Test

A phosphate-treated sample was electrodeposition-coated with a cation electrodeposition paint No. 9210 supplied by Kansai Paint to form a coating film having a thickness of 20μ, and Amilac No. 002 supplied by Kansai Paint was spray-coated in a thickness of 40μ, and the primary adhesion and secondary adhesion were tested. The primary adhesion test was carried out under the same conditions as described in Example 1. At the secondary adhesion test, the coated sample was immersed in warm water (pure water) at 40° C. for 240 hours and was taken out, and in the same manner as described in Example 1, square cuts were formed at intervals of 1 mm within 30 minutes and an adhesive tape was applied to the cut surface and was then peeled.

Corrosion Resistance Test

Some tests, as mentioned below, were carred out according to a cycle test comprising a cycle of the following steps.

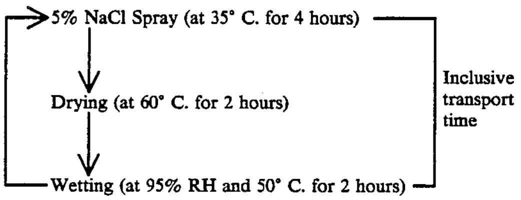

Flat Plate CCT

Samples in the form of a flat plate were used as such, and were tested until 300 cylcles.

Sharply Cut CCT

Samples in the form of a flat plate were provided with sharp cuts (in the form of crosscuts of about 1 mm in width), and were tested until 100 cycles.

Post-Working CCT (Post-Working Corrosion Resistance of Uncoated Samples)

◎: no red rusting
○+: red rusting-occurring area ratio smaller than 5%
○: red rusting-occurring area ratio of 5 to 10%
○−: red rusting occurring area ratio of 10 to 20%
Δ: red rusting-occurring area ratio of 20 to 50%
X: red rusting-occurring area ratio larger than 50%

Cr Elution Test

With 1 l of a liquid degreasing agent FC-4410 manufactured by Nippon Parker Rising, 0.6 $m^2$ of a specimen were degreased under standard conditions to determine the amount of Cr in that liquid by atomic absorption.

The results of various tests were estimated on the following bases.

(1) Corrosion Resistance (common to flat plate, post-working and sharp cutting tests)
Same as in Example 1.
(2) Double-Coat Adhesion
Same as in Example 1.
(3) Cr Elution
Same as in Example 1.

TABLE 7

| No | Base Sheet (*6) | Cr film Type | Cr film A | R (*1) | Resin Film: Silica component Type *2 | Resin Film: Silica component C | Resin Film: D Type *3 | Resin Film: D E | Resin Film: E *4 | Resin Film: F *5 | G | H | Corrosion Resistance I | Corrosion Resistance J | Corrosion Resistance K | Cr elusion | L M | L N | Remarks |
|---|---|---|---|---|---|---|---|---|---|---|---|---|---|---|---|---|---|---|---|
| Examples of Invention | | | | | | | | | | | | | | | | | | | |
| 1 | A | S | 50 | (1) | (3) | 67/33 | (4) | 86/14 | 60/40 | 30/10 | 1.0 | 60 | ◎ | ◎ | ◎ | ○ | ◎ | ○ | |
| 2 | " | " | " | " | " | " | " | " | " | " | " | 80 | ◎ | ◎ | ◎ | ◎ | ◎ | ◎ | |
| 3 | " | " | " | " | " | " | " | " | " | " | " | 150 | ◎ | ◎ | ◎ | ◎ | ◎ | ◎ | |
| 4 | " | " | " | " | " | " | " | " | " | " | " | 200 | ◎ | ◎ | ◎ | ◎ | ◎ | ◎ | |
| 5 | " | " | " | " | " | " | " | " | " | " | " | 250 | ◎ | ◎ | ◎ | ◎ | ◎ | ◎ | |
| 6 | " | " | " | " | " | " | " | " | " | " | 0.2 | 150 | ○+ | ○+ | ○+ | ◎ | ◎ | ◎ | |
| 7 | " | " | " | " | " | " | " | " | " | " | 0.5 | " | ◎ | ◎ | ◎ | ◎ | ◎ | ◎ | |
| 8 | " | " | " | " | " | " | " | " | " | " | 2.5 | " | ◎ | ◎ | ◎ | ◎ | ◎ | ◎ | |
| 9 | " | " | " | " | " | " | " | " | " | " | 3.9 | " | ◎ | ◎ | ◎ | ◎ | ◎ | ◎ | P |
| 10 | " | " | " | " | " | 80/20 | " | 92/8 | 75/25 | " | 1.0 | " | ◎ | ○+ | ○+ | ◎ | ◎ | ◎ | |
| 11 | " | " | " | " | " | 76/24 | " | 90/10 | 70/30 | " | 1.0 | " | ◎ | ◎ | ◎ | ◎ | ◎ | ◎ | |
| 12 | " | " | " | " | " | 62/38 | " | 83/17 | 55/45 | " | " | " | ◎ | ◎ | ◎ | ◎ | ◎ | ◎ | |
| 13 | " | " | " | " | " | 57/43 | " | 80/20 | 50/50 | " | " | " | ◎ | ○+ | ○+ | ◎ | ◎ | ◎ | |
| 14 | " | " | " | " | " | 62/38 | " | 95/5 | 60/40 | 37/3 | " | " | ○ | ○+ | ○+ | ◎ | ◎ | ◎ | |
| 15 | " | " | " | " | " | 63/37 | " | 92/8 | " | 35/5 | " | " | ◎ | ◎ | ◎ | ◎ | ◎ | ◎ | |
| 16 | A | S | 50 | (1) | (3) | 71/29 | (4) | 80/20 | 60/40 | 25/15 | 1.0 | 150 | ◎ | ◎ | ◎ | ◎ | ◎ | ◎ | |
| 17 | " | " | " | " | " | 75/25 | " | 75/25 | " | 20/20 | " | " | ◎ | ○+ | ○+ | ◎ | ◎ | ◎ | |
| 18 | " | " | " | " | (1) | 67/33 | " | 86/14 | " | 30/10 | " | " | ◎ | ◎ | ◎ | ◎ | ◎ | ○ | |
| 19 | " | " | " | " | (2) | " | " | " | " | " | " | " | ◎ | ◎ | ◎ | ◎ | ◎ | ◎ | |
| 20 | " | " | " | " | (4) | " | " | " | " | " | " | " | ◎ | ◎ | ◎ | ◎ | ◎ | ◎ | |
| 21 | A | | 50 | (I) | (3) | 67/33 | (1) | 86/14 | 60/40 | 30/10 | 1.0 | 150 | ◎ | ◎ | ◎ | ○ | ◎ | ◎ | |
| 22 | " | " | " | " | " | " | (2) | " | " | " | " | " | ◎ | ○+ | ○+ | ○ | ◎ | ◎ | |
| 23 | " | " | " | " | " | " | (3) | " | " | " | " | " | ◎ | ○+ | ○+ | ◎ | ◎ | ◎ | |
| 24 | " | " | " | " | " | " | (5) | " | " | " | " | " | ◎ | ○+ | ○+ | ◎ | ◎ | ◎ | |
| 25 | " | " | " | " | " | " | (6) | " | " | " | " | " | ◎ | ○+ | ○+ | ○ | ◎ | ◎ | |
| 26 | " | " | " | " | " | " | (8) | " | " | " | " | " | ◎ | ○+ | ○+ | ○ | ◎ | ◎ | |
| 27 | " | " | " | (II) | " | " | (4) | " | " | " | " | " | ◎ | ◎ | ◎ | ◎ | ◎ | ◎ | |
| 28 | " | " | " | (I) | " | " | " | " | " | " | " | " | ○+ | ○+ | ○+ | ◎ | ◎ | ◎ | |
| 29 | " | " | 30 | " | " | " | " | " | " | " | " | " | ◎ | ◎ | ◎ | ◎ | ◎ | ◎ | |
| 30 | " | " | 80 | " | " | " | " | " | " | " | " | " | ◎ | ◎ | ◎ | ◎ | ◎ | ◎ | |
| 31 | " | " | 200 | " | " | " | " | " | " | " | " | " | ◎ | ◎ | ◎ | ○ | ◎ | ◎ | Q |
| 32 | " | T | " | " | " | " | " | " | " | " | " | " | ◎ | ◎ | ◎ | ◎ | ◎ | ◎ | Q |
| 33 | B | S | 50 | " | " | " | " | " | " | " | " | " | ○ | ○ | ◎ | ◎ | ◎ | ◎ | |

TABLE 7-continued

| No | Base Sheet (*6) | Cr film Type | Cr film A | Resin Film R (*1) | Silica component Type *2 | Silica component C | D Type *3 | D E | E *4 | F *5 | G | H | Corrosion Resistance I | Corrosion Resistance J | Corrosion Resistance K | Cr elusion | L M | L N | Remarks |
|---|---|---|---|---|---|---|---|---|---|---|---|---|---|---|---|---|---|---|---|
| 34 | C | " | " | " | " | " | " | " | " | " | " | " | ○+ | ○+ | ○+ | ◎ | ◎ | ◎ | |
| 35 | D | " | " | " | " | " | " | " | " | " | " | " | ○+ | ○+ | ○+ | ◎ | ◎ | ◎ | |
| 36 | E | " | " | " | " | " | " | " | " | " | " | " | ○ | ○ | ○ | ◎ | ◎ | ◎ | |
| 37 | F | | 50 | (I) | (3) | 67/33 | (4) | 86/14 | 60/40 | 30/10 | 1.0 | 150 | ○+ | + | ○+ | ◎ | ◎ | ◎ | |
| 38 | G | " | " | " | " | " | " | " | " | " | " | " | ◎ | ◎ | ◎ | ◎ | ◎ | ◎ | |
| 39 | A | " | " | " | " | 47/53 | " | 73/27 | 40/60 | " | " | " | ○ | Δ | Δ | Δ | Δ | Δ | |
| 40 | " | " | " | " | " | 86/14 | " | 67/33 | 60/40 | 10/30 | " | " | ○ | Δ | Δ | ◎ | ◎ | ◎ | |
| 41 | " | " | " | " | (5) | 67/33 | " | 86/14 | " | 30/10 | " | " | Δ | X | X | ◎ | ◎ | ◎ | |
| 42 | " | " | " | (III) | (3) | " | " | " | " | " | " | " | ○ | Δ | Δ | ◎ | ○ | ○ | |
| 43 | " | " | " | (I) | " | " | " | " | " | " | " | " | Δ | Δ | ○ | ◎ | ○ | ○ | |
| 44 | " | " | 300 | " | " | " | " | " | " | " | " | " | ◎ | ◎ | ◎ | X | ◎ | ◎ | U |

Note
A through U: Same as those of above Tables

TABLE 8

| No | Base Sheet (*6) | Cr film Type | Cr film A | R (*1) | Resin Film: Silica component Type *2 | Silica component C | D Type *3 | D E | E *4 | E *5 | G | H | Corrosion Resistance I | Corrosion Resistance J | Corrosion Resistance K | Cr elusion | L M | L N | Remarks |
|---|---|---|---|---|---|---|---|---|---|---|---|---|---|---|---|---|---|---|---|
| Examples of comparison | | | | | | | | | | | | | | | | | | | |
| 1 | A | | 50 | (I) | (3) | 67/33 | (4) | 86/14 | 60/40 | 30/10 | 1.0 | | O | O | O | X | O | Δ | |
| 2 | " | " | " | " | " | " | " | " | " | " | " | 300 | O | O | O | ⊚ | O | O | |
| 3 | " | " | " | " | " | " | " | " | " | " | 0.1 | 150 | ⊚ | Δ | Δ | ⊚ | ⊚ | ⊚ | |
| 4 | " | " | " | " | " | " | " | " | " | " | 5.0 | " | ⊚ | ⊚ | ⊚ | ⊚ | Δ | Δ | U |
| 5 | " | " | " | " | " | 92/ 8 | | 97/ 3 | 90/10 | " | 1.0 | " | O | Δ | Δ | ⊚ | ⊚ | ⊚ | |
| 6 | " | " | " | " | " | 60/40 | — | — | 60/40 | 40/ 0 | " | " | ⊚ | Δ | Δ | ⊚ | ⊚ | ⊚ | |
| 7 | " | " | " | " | — | — | (4) | 60/40 | " | 0/40 | " | " | Δ | X | X | ⊚ | ⊚ | ⊚ | |
| 8 | " | " | " | " | (3) | 67/33 | (7) | 86/14 | " | 30/10 | " | " | Δ | X | X | X | O | O | |
| 9 | " | " | " | (IV) | " | " | (4) | " | " | " | " | " | O | O | O | ⊚ | X | X | |
| 10 | " | " | " | " | " | " | " | " | " | " | " | 260 | O | Δ | Δ | ⊚ | O+ | O+ | |
| 11 | Zinchrometal | | | | | | | | | | | | Δ | X | X | ⊚ | ⊚ | ⊚ | |

(*1) Refer to Table 10
(*2) Refer to Table 11
(*3) Refer to Table 12
(*4) Weight ratio of Substrate resin and [Silica + Sparingly water soluble Cr compound], i.e., Substrate resin/[Silica + Sparingly water soluble Cr compound]
(*5) Weight ratio of Silica and sparingly water soluble Cr compound dispersed in the substrate reson, i.e., Silica/Sparingly water soluble Cr compound
(*6) Refer to Table 9

TABLE 9

| Plated sheets | | |
|---|---|---|
| A | Electric Zn—alloy plating | (12% Ni—Zn, 20 g/m$^2$) |
| B | Electric Zn—alloy plating | (25% Fe—Zn, 40 g/m$^2$) |
| C | Galvanization | (40 g/m$^2$) |
| D | Hot-dip Zn plating | (90 g/m$^2$) |
| E | Hot-dip Zn-alloy P. | (10% Fe—Zn, 45 g/m$^2$) |
| F | Hot-dip Zn-alloy P. | (5.0% Al—0.5% Mn, 90 g/m$^2$) |
| G | Electric Zn-alloy plating | (60% Mn—Zn, 20 g/m$^2$) |

TABLE 10

| No. | Base Resin |
|---|---|
| I | |
| II | |
| III | Product obtained by adding 30 g/l of acetic acid to resin A obtained in "Substrate resin" in Example 1 to render it water soluble |
| IV | Prganic composite silicate (silica sol content = 40%, acrylic/epoxy ratio = 30/70) prepared according tc Japanese Patent Application Laid-Open Specification No. 174879/85 |

TABLE 11

| No. | Additive |
|---|---|
| 1 | Colloidal silica dispersed in organic solvent (supplied by Shokubai Kasei Kogyo Sha OSCAL 1432) |
| 2 | Colloidal silica dispersed in organic solvent (supplied by Shokubai Kasei Kogyo Sha OSCAL 1622) |
| 3 | Hydrophobic ultra-fine particulate silica (supplied by Nihon Aerozil Sha R 811) |
| 4 | Hydrophobic ultra-fine particulate silica (supplied by Nihon Aerozil Sha R 805) |
| 5 | Hydrophilic ultra-fine particulate silica silica) (supplied by Nihon Aerozil Sha 200) |
| 6 | Aluminum phosphomolybdate (supplied by Kikuchi Shikiso Kogyo) |
| 7 | 100 parts (*1) of No. 1 + 100 parts of aluminum phosphomolybdate |

Note (*1) Mixing solid ratio

TABLE 12

| No. | Cr compounds | |
|---|---|---|
| 1 | $SrCrO_4$ | (Kikuchi Shikiso Kogyo) |
| 2 | $PbCrO_4$ | (") |
| 3 | $ZnCrO_4.4Zn(OH)_2$ | (") |
| 4 | $BaCrO_4$ | (") |
| 5 | $CaCrO_4$ | (") |
| 6 | $K_2O.4ZnO.4CrO_3.3H_2O$ | (") |
| 7 | $K_2CrO_4$ | (Nihon Kagaku Kogyo) |
| 8 | $AgCrO_4$ | (Kanto Kagaku) |

In the steel plates of the present invention obtained in the foregoing examples, their uppermost layers are each formed of a film possessing alkali resistance, wherein the basic epoxy resin is used as the base resin. In addition, excellent corrosion resistance is imparted to the chromate films per se without causing deterioration thereof and reduction of $Cr^{6+}$, since the resin is of the low-temperature drying type.

Referring to post-coating corrosion resistance, the prior art steel plates of the low-temperature bake type (150° C.) coated with an organic composite silicate are apt to blister by alkali because of the films being poor in alkali resistance, whereas the prior art steel plates of the high-temperature bake type (260° C.) are somewhat apt to corrode laterally from cut portions and blister because of the corrosion resistance of chromate being degraded. In the instant examples, however, since the films are improved in alkali resistance and the chrmate films retain excellent corrosion resistance, satisfactory post-coating corrosion resistance is obtained. It is noted that the width of blisters occurring in Zinchrometal are due to the occurrence of red rust.

Referring to post-working corrosion resistance, the conventional steel plates of the low-temperature bake type (150° C.) coated with an organic composite silicate are poor in corrosion resistance because of the films being insufficiently crosslinked and being poor in alkali resistance. This is because upon partly damaged by working, the films deteriorate by alkali degreasing in the phosphate treatment. The steel plates of the high-temperature bake type are also inferior in corrosion resistance due to deterioration of the corrosion resistance of chromate and damaging of the films. In the examples of the present invention, however, satisfactory corrosion resistance is obtained even after working, since the strength and alkali resistance of the films are improved and the corrosion resistance of chromate is retained.

In view of corrosion resistance in particular, it is preferable to incorporate the hydrophobic silica and hardly soluble Cr compound into the base resin in the silica: hardly soluble Cr compound ratio in weight ranging from 35:5 to 25:15, and use $BaCrO_4$ and $SrCrO_4$ as the hardly soluble Cr compound.

In view of Cr elution, preference is given to $BaCrO_4$, $ZnCrO_4.Zn(OH)_2$ and $CaCrO_4$. In order to achieve the most excellent quality/performance combination (esp., corrosion resistance and Cr elution), therefore, the hydrophobic silica and $BaCrO_4$ may be dispersed in the base resin in the weight ratio ranging from 35:5 to 25:15.

What is claimed is:

1. A highly corrosion-resistant surface-treated steel plate comprising a zinc-deposited or zinc alloy-deposited steel plate, a chromate film formed on the steel plate and a film of a resin composition formed on the chromate film, said resin composition comprising a base resin obtained by adding at least one basic nitrogen atom and at least two primary hydroxyl groups to terminals of an epoxy resin, a polyisocyanate compound, the amount of said polyisocyanate compound being in the range of 5 to 80 parts per 100 parts resin, silica and sparingly water soluble Cr compound, the base resin/silica weight ratio being in the range of from 99/1 to 30/70 and the base resin/sparingly water soluble Cr compound weight ratio being in the range of from 99/1 to 60/40, and wherein weight ratio of the base resin/(silica+sparingly water soluble Cr compound) is 75/25 to 50/50, and the weight ratio of silica:sparingly water soluble Cr compound is 37/3 to 20/20.

2. The plate as claimed in claim 1, wherein the base resin/polyisocyanate compound weight ratio is in the range of from 100/5 to 100/80.

3. The plate as claimed in claim 1, wherein the base resin/polyisocyanate compound weight ratio is in the range of from 100/10 to 100/50.

4. The plate as claimed in claim 1, 2 or 3, wherein the base resin/silica weight ratio is in the range of from 90/10 to 50/50.

5. The plate as claimed in claim 1, 2 or 3, wherein the base resin/silica weight ratio is in the range of from 80/20 to 60/40.

6. The plate as claimed in claim 1, 2 or 3, wherein the silica is hydrophobic silica.

7. The plate as claimed in claim 1, 2 or 3, wherein weight ratio of the base resin/Cr compound with less solubility is in the range of from 97/3 to 65/35.

8. The plate as claimed in claim 1, 2 or 3, wherein weight ratio of the base resin/Cr compound with less solubility is in the range of from 95/5 to 75/25.

9. The plate as claimed in claim 1, 2 or 3, wherein the amount (dry base) deposited of chromium in the chromate film is 1 to 1000 $mg/m^2$ as calculated as the metallic chromium, and the amount deposited of the film of the resin composition is 0.1 to 3.5 $g/m^2$.

10. The plate as claimed in claim 1, 2 or 3, wherein the amount (dry base) deposited of chromium in the chromate film is 10 to 200 $mg/m^2$, as calculated as the metallic chromium, and the amount deposited of the film of the resin composition is 0.3 to 2.0 $g/m^2$.

11. The plate as claimed in claim 1, 2 or 3, wherein the weight ratio of the base resin/(silica+sparingly water soluble Cr compound) is 70/30 to 55/45.

12. The plate as claimed in claim 1, 2 or 3, wherein the weight ratio of the base resin/sparingly water soluble Cr compound is 35/5 to 25/15.

13. The plate as claimed in claim 1, 2 or 3, wherein the base resin is a solvent.

14. The plate as claimed in claim 1, 2 or 3, wherein the sparingly watre soluble Cr compound is $BaCrO_4$.

15. The plate as claimed in claim 1, 2 or 3, wherein an alkyl-etherified amino resin is incorporated as a crosslinking agent in the film of the resin composition.

16. The plate as claimed in claim 1, 2 or 3, wherein a resin other than an epoxy resin, selected from acrylic resins, alkyd resins and polyester resin, is incorporated in the film of the resin composition.

17. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a substrate resin obtained by adding at least one basic nitrogen atom and at least two primary hydroxyl groups to terminals of an epoxy resin, a polyisocyanate compound, silica, a silane compound and a sparingly water soluble Cr compound, the amount of said polyisocyanate compound being in the range of 5 to 80 parts per 100 parts resin, the substrate resin/silica weight ratio being in the range of from 99/1 to 30/70, the amount of the silane compound being 0.1 to 15 parts per 100 parts of the sum of the substrate resin and silica and the substrate resin/sparingly water soluble Cr compound weight ratio being in the range of from 99/1 to 60/40, and wherein weight ratio of the substrate resin/-(silica+sparingly water soluble Cr compound) is 75/25 to 50/50, and the weight ratio of silica/sparingly water soluble Cr compound is 37/3 to 20/20.

18. The plate as claimed in claim 17, wherein the substrate resin/polyisocyanate compound weight ratio is in the range of from 100/5 to 100/80.

19. The plate as claimed in claim 17, wherein the substrate resin/polyisocyanate compound weight ratio is in the range of from 100/10 to 100/50.

20. The plate as claimed in claim 17, 18 or 19, wherein the substrate resin/silica weight ratio is in the range of from 90/10 to 50/50.

21. The plate as claimed in claim 17, 18 or 19, wherein the substrate resin/silica weight ratio is in the range of from 80/20 to 60/40.

22. The plate as claimed in claim 17, 18 or 19, wherein the silica is hydrophobic silica.

23. The plate as claimed in claim 17, 18 or 19, wherein the substrate resin/sparingly water soluble Cr compound weight ratio is in the range of from 97/3 to 65/35.

24. The plate as claimed in claim 17, 18 or 19, wherein the substrate resin/sparingly water soluble Cr compound weight ratio is in the range of from 95/5 to 75/25.

25. The palte as calimed in claim 17, 18 or 19, wherein the amount (dry) deposited of chromium in the chromate film is 1 to 1000 $mg/m^2$, as calculated as the metallic chromium and the amount deposited of the film of the resin composition is 0.1 to 3.5 $g/m^2$.

26. The plate as claimed in claim 17, 18 or 19, wherein the amount (dry base) deposited of chromium in the chromate film is 10 to 200 $mg/m^2$, as calculated as the metallic chromium and the amount deposited of the film of the resin composition is 0.3 to 2.0 $g/m^2$.

27. The palte as claimed in claim 17, 18 or 19, wherein the weight ratio of the substrate resin/(silica+sparingly water soluble Cr compound) is 70/30 to 55/45.

28. The plate as claimed in claim 17, 18 or 19 to 26 or 27, wherein the weight ratio of the substrate resin/sparingly water soluble Cr compound is 35/5 to 25/15.

29. The plate as claimed in claim 17, 18 or 19, wherein the substrate resin is a solvent.

30. The plate as claimed in claim 17, 18 or 19, wherein the sparingly water soluble Cr compound is $BaCrO_4$.

31. The plate as claimed in claim 17, 18 or 19, wherein the alkyl-etherified amino resin is incorporated as a crosslinking agent in the film of the resin composition.

32. The plate as claimed in claim 17, 18 or 19, wherein the resin other than an epoxy resin, selected from acrylic resins, alkyd resins and polyester resins, is incorporated in the film of the resin composition.

33. A highly corrosion-resistant surface-treatred steel plate comprising a zinc-deposited or zinc alloy-deposited steel plate, chromate film formed on the surface of the steel plate and a film of a resin composition formed on the chromate film, said resin composition comprising a substrate resin obtained by adding at least one basic nitrogen atom and at least two primary hydroxyl groups to terminals of an epoxy resin, silica and sparingly water soluble Cr compound, the substrate resin/silica weight ratio being in the range of from 99/1 to 30/70 and the substrate resin/sparingly water soluble Cr compound weight ratio being in the range of from 99/1 to 60/40, and wherein weight ratio of substrate resin/(silica+-sparingly water soluble Cr compound) is 75/25 to 50/50, and the weight ratio of silica/sparingly water soluble Cr compound is 37/3 to 20/20.

34. The plate as claimed in claim 33, wherein the substrate resin/silica weight ratio is in the range of from 90/10 to 50/50.

35. The plate as claimed in claim 33, wherein the substrate resin/silica weight ratio is in the range of from 80/20 to 60/40.

36. The plate as claimed in claim 33, 34 or 35, wherein the silica is hydrophobic silica.

37. The plate as claimed in claim 33, 34 or 35, wherein the substrate resin/sparingly water soluble Cr compound weight ratio is in the range of from 97/3 to 65/35.

38. The plate as claimed in claim 33, 34 or 35, wherein the substrate resin/sparingly wate soluble Cr compound weight ratio is in the range of from 95/5 to 75/25.

39. The plate as claimed in claim 33, 34 or 35, wherein the amount (dry base) deposited of chromium in the chromate film is 1 to 1000 mg/m$^2$, as calculated as the metallic chromium and the amount deposited of the film of the resin compositioin is 0.1 to 3.5 g/m$^2$.

40. The plate as claimed in claim 33, 34 or 35, wherein the amount (dry base) deposited of chromium in the chromate film is 10 to 200 mg/m$^2$, as calculated as the metallic chromium and the amount deposited of the film of the resin composition is 0.3 to 2.0 g/m$^2$.

41. The plate as claimed in claim 33, 34 or 35, wherein the weight ratio of the substrate resin/(silica+sparingly water soluble Cr compound) is 70/30 to 55/45.

42. The plate as claimed in claim 33, 34 or 35, wherein the weight ratio of the substrate resin/sparingly water soluble Cr compound is 35/5 to 25/15.

43. The plate as claimed in claim 33, 34 or 35, wherein the substrate resin is a solvent.

44. The plate as claimed in claim 33, 34 or 35, wherein the sparingly water soluble Cr compound is $BaCrO_4$.

45. The palte as claimed in claim 33, 34 or 35, wherein the alkil-etherified amino resin is incorporated as a crosslinking agent in the film of the resin composition.

46. The plate as claimed in claim 33, 34 or 35, wherein a resin other than an epoxy resin, selected acrylic resins, alkyd resin and polyester resins, is incorporated in the film of the resin composition.

47. The plate as claimed in claim 1, 17 or 33, wherein the zinc-deposited or zinc alloy-deposited film, the chromate film and the film of the resin composition are arranged on one surface of the steel plate substrate in this order from the surface side of the steel plate substrate, and the other surface of the steel plate substrate is not deposited with a metal.

48. The plate as claimed in claim 1, 17 or 33, wherein the zinc-deposited or zinc alloy-deposited film, the chromate film and the film of the resin composition are arranged on one surface of the steel plate substrate in this order from the surface side of the steel plate substrate and the other surface of the steel plate substrate is deposited with a metal.

49. The plate as claimed in claim 1, 17 or 33, wherein the zinc-deposited or zinc alloy-deposited film, the chromate film and the film of the resin composition are arranged on each of the surfaces of the steel plate substrate in this order from the surface side of the steel plate substrate.

50. The plate as claimed in claim 1, 17 or 33, wherein the zinc alloy-deposited steel plate is a zinc/nickel alloy-deposited steel plate.

51. The plate as claimed in claim 50, wherein at least one element selected from the group consisting of Ni, Fe, Mo, Co, Al, and Cr is incorporated in the basic component of the deposited zinc alloy.

52. The plate as claimed in claim 50, wherein the nickel content in the zinc/nickel alloy-deposited film is 5 to 20% by weight.

53. The plate as claimed in claim 1, 17 or 33, wherein the zinc-deposited steel plate is a zinc/alloy-deposited steel plate.

54. The plate as claimed in claim 51, wherein at least one element selected from the group consisting of Ni, Fe, Mo, Co, Al, and Cr is incorporated in the basic component of the deposited zinc alloy.

55. The plate as claimed in claim 1, 17 or 33, wherein the zinc alloy-deposited steel plate is a zinc/manganese alloy-deposited steel plate.

56. The plate as claimed in claim 52, wherein the manganese content in the zinc/manganese alloy-deposited film is 30 to 85% by weight.

57. The plate as claimed in claim 52, wherein at least one element selected from the group consisting of Ni, Fe, Mo, Co, Al, and Cr is incorporated in the basic component of the deposited zinc alloy.

58. The plate as claimed in claim 1, 17 or 33, wherein the zinc alloy-deposited steel plate is zinc/aluminum alloy deposited steel plate.

59. The plate as claimed in claim 53, wherein at least one element selected from the group consisting of Ni, Fe, Mo, Co and Cr is incorporated in the basic component of the deposited zinc alloy.

60. The plate as claimed in claim 1, 17 or 33, wherein the zinc alloy-deposited steel plate is a zinc/cobalt/-chromium alloy-deposited steel plate.

61. The plate as claimed in claim 54, wherein at least one element selected from the group consisting of Ni, Fe, Mo and Al is incorporated in the basic component of the deposited zinc alloy.

62. The plate as claimed in claim 1, 17 or 33, wherein the zinc-deposited or zinc alloy-deposited film comprises at least two metal deposition layers.

63. The plate as claimed in claim 55, wherein the zinc alloy-deposited film comprises at least two zinc/iron alloy-deposited layers differing in the iron content.

* * * * *